United States Patent
Hatano et al.

(10) Patent No.: US 10,676,101 B2
(45) Date of Patent: *Jun. 9, 2020

(54) VEHICLE CONTROL SYSTEM, VEHICLE CONTROL METHOD, AND VEHICLE CONTROL PROGRAM

(71) Applicant: HONDA MOTOR CO., LTD., Minato-ku, Tokyo (JP)

(72) Inventors: Kunimichi Hatano, Wako (JP); Masahiko Asakura, Wako (JP); Naoto Sen, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/090,846

(22) PCT Filed: Apr. 13, 2016

(86) PCT No.: PCT/JP2016/061897
§ 371 (c)(1),
(2) Date: Oct. 3, 2018

(87) PCT Pub. No.: WO2017/179151
PCT Pub. Date: Oct. 19, 2017

(65) Prior Publication Data
US 2019/0106120 A1    Apr. 11, 2019

(51) Int. Cl.
*B60W 50/08*    (2020.01)
*G08G 1/09*    (2006.01)
(Continued)

(52) U.S. Cl.
CPC .......... *B60W 50/082* (2013.01); *B60W 10/04* (2013.01); *B60W 10/20* (2013.01);
(Continued)

(58) Field of Classification Search
CPC ...... B60W 10/04; B60W 10/20; B60W 30/00; B60W 50/082; G08G 1/09; G08G 1/096708; G08G 1/0969
See application file for complete search history.

(56) References Cited

U.S. PATENT DOCUMENTS 5,530,651 A * 6/1996 Uemura ................ G01S 15/86
                                                                701/301
6,825,756 B2 * 11/2004 Bai ........................ G01S 13/931
                                                                340/435
(Continued)

FOREIGN PATENT DOCUMENTS

JP    2000-205000    7/2000
JP    2001-273588    10/2001
(Continued)

OTHER PUBLICATIONS

International Search Report and Written Opinion for International Application No. PCT/JP2016/061897 dated Jul. 19, 2016, 10 pgs.
(Continued)

*Primary Examiner* — Babar Sarwar
(74) *Attorney, Agent, or Firm* — Amin, Turocy & Watson, LLP

(57) ABSTRACT

A vehicle control system including: a recognition unit that is configured to recognize a peripheral situation of a subject vehicle; an automated driving control unit that is configured to execute a plurality of driving modes including an automated driving mode of automatically performing at least one of speed control and steering control of the subject vehicle, and switch a driving mode that is executed on the basis of the peripheral situation recognized by the recognition unit; a communication unit that is configured to transmit information related to switching sites switched to a driving mode in which the degree of automated driving is low by the automated driving control unit on the basis of the peripheral (Continued)

situation recognized by the recognition unit to an external device, and receive information related to a specific site derived on the basis of the information related to the switching sites, which is collected from vehicles, from the external device; and an information providing unit that is configured to output predetermined information in a case where the subject vehicle approaches the specific site indicated by the information related to the specific site which is received by the communication unit.

7 Claims, 14 Drawing Sheets

(51) Int. Cl.
*G08G 1/0969* (2006.01)
*B60W 30/00* (2006.01)
*B60W 10/04* (2006.01)
*B60W 10/20* (2006.01)
*G08G 1/0967* (2006.01)

(52) U.S. Cl.
CPC .............. *B60W 30/00* (2013.01); *G08G 1/09* (2013.01); *G08G 1/0969* (2013.01); *G08G 1/096708* (2013.01)

(56) References Cited

U.S. PATENT DOCUMENTS

| | | | | |
|---|---|---|---|---|
| 7,395,144 | B2* | 7/2008 | Isaji | B60T 7/22 180/170 |
| 7,983,828 | B2* | 7/2011 | Ezoe | B60T 7/12 180/275 |
| 8,244,458 | B1* | 8/2012 | Blackburn | G08G 1/166 340/435 |
| 8,532,901 | B2* | 9/2013 | Nitz | B60K 31/0008 340/467 |
| 8,736,483 | B2* | 5/2014 | Takeuchi | B60W 30/09 342/71 |
| 2002/0184236 | A1* | 12/2002 | Donath | B60R 1/00 |
| 2004/0030499 | A1* | 2/2004 | Knoop | B60W 10/18 701/301 |
| 2007/0005609 | A1* | 1/2007 | Breed | G01S 13/867 |
| 2009/0043440 | A1* | 2/2009 | Matsukawa | G05D 1/0214 701/25 |
| 2009/0088925 | A1* | 4/2009 | Sugawara | B60W 30/12 701/41 |
| 2009/0150034 | A1* | 6/2009 | Ezoe | B60T 7/12 701/53 |
| 2010/0076676 | A1* | 3/2010 | Machino | G01C 21/3461 701/413 |
| 2010/0134263 | A1* | 6/2010 | Mathony | B60W 30/09 340/435 |
| 2012/0235853 | A1* | 9/2012 | Takeuchi | B60W 30/09 342/71 |
| 2012/0239265 | A1* | 9/2012 | Kato | B60T 7/22 701/70 |
| 2014/0229069 | A1* | 8/2014 | Akiyama | B60T 7/12 701/41 |
| 2015/0211868 | A1 | 7/2015 | Matsushita et al. | |
| 2015/0353088 | A1 | 12/2015 | Ishikawa | |
| 2016/0327947 | A1* | 11/2016 | Ishikawa | B60W 50/14 |
| 2016/0335892 | A1* | 11/2016 | Okada | B60T 7/22 |
| 2017/0053534 | A1* | 2/2017 | Lokesh | G08G 1/22 |
| 2017/0313325 | A1* | 11/2017 | Asakura | G05D 1/0248 |
| 2018/0268702 | A1* | 9/2018 | Morotomi | G08G 1/166 |
| 2019/0039626 | A1* | 2/2019 | Hatano | G05D 1/0088 |
| 2019/0113914 | A1* | 4/2019 | Abe | B60W 30/10 |

FOREIGN PATENT DOCUMENTS

| | | | |
|---|---|---|---|
| JP | 2004-157731 | 6/2004 | |
| JP | 2004-347470 | 12/2004 | |
| JP | 2005-067483 | 3/2005 | |
| JP | 2006-111170 | 4/2006 | |
| JP | 2008-170404 | 7/2008 | |
| JP | 2009-029386 | 2/2009 | |
| JP | 2015-024746 | 2/2015 | |
| JP | 2015-089801 | 5/2015 | |
| JP | 2015-141051 | 8/2015 | |
| JP | 2015141051 A * | 8/2015 | |
| JP | 2015-157513 | 9/2015 | |
| JP | 2015-168406 | 9/2015 | |
| JP | 2015-175825 | 10/2015 | |
| JP | 2015-182624 | 10/2015 | |
| JP | 2015-230573 | 12/2015 | |
| JP | 2016-045856 | 4/2016 | |
| JP | 2016-095627 | 5/2016 | |
| WO | 2008/068953 | 6/2008 | |
| WO | 2014/013985 | 1/2014 | |
| WO | 2015/190212 | 12/2015 | |
| WO | 2016/052507 | 4/2016 | |
| WO | WO-2016052507 A1 * | 4/2016 | ............ B60W 30/10 |
| WO | 2017/051478 | 3/2017 | |

OTHER PUBLICATIONS

International Search Report and Written Opinion for International Application No. PCT/JP2016/061534 dated Jul. 5, 2016, 14 pgs.
Japanese Office Action for Japanese Patent Application No. 2018-510207 dated Jul. 2, 2019.
Non-Final Office Action for U.S. Appl. No. 16/090,294 dated Oct. 4, 2019.
International Preliminary Report on Patentability for International Application No. PCT/JP2016/061534 dated Jul. 17, 2018, 16 pgs.

* cited by examiner

| DRIVING MODE<br>NON-DRIVING<br>OPERATION SYSTEM | MANUAL<br>DRIVING<br>MODE | AUTOMATED DRIVING MODE | | | ... |
| --- | --- | --- | --- | --- | --- |
| | | MODE A | MODE B | MODE C | |
| NAVIGATION<br>OPERATION | NOT-<br>AVAILABLE | AVAILABLE | AVAILABLE | NOT-<br>AVAILABLE | ... |
| CONTENT REPRODUCING<br>OPERATION | NOT-<br>AVAILABLE | AVAILABLE | NOT-<br>AVAILABLE | NOT-<br>AVAILABLE | ... |
| INSTRUMENT PANEL<br>OPERATION | NOT-<br>AVAILABLE | AVAILABLE | AVAILABLE | AVAILABLE | ... |
| ... | ... | ... | ... | ... | ... |

FIG. 14

| TRAVEL ROUTE | PRESENCE OR ABSENCE<br>OF MODE SWITCHING | MODE SWITCHING<br>TIME | REASON FOR MODE<br>SWITCHING |
| --- | --- | --- | --- |
| ROUTE A | PRESENCE | 16:09:11 | DARKER THAN ASSUMED |
| ROUTE B | ABSENCE | — | — |
| ROUTE C | PRESENCE | 08:25:56 | CONGESTION OF<br>MERGING SITE |
| ... | ... | ... | ... |

334

| ROUTE | BEFORE ONE DAY | BEFORE TWO DAYS | BEFORE THREE DAYS | BEFORE FOUR DAYS | BEFORE FIVE DAYS | ... |
|---|---|---|---|---|---|---|
| ROUTE A | MAP A1 | MAP A2 | MAP A3 | MAP A4 | MAP A5 | ... |
| ROUTE B | MAP B1 | MAP B2 | MAP B3 | MAP B4 | MAP B5 | ... |
| ROUTE C | MAP C1 | MAP C2 | MAP C3 | MAP C4 | MAP C5 | ... |
| ... | ... | ... | ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent, research on a technology of automatically controlling at least one of acceleration/deceleration and steering of a subject vehicle (hereinafter, referred to as "automated driving") has been in progress. In this regard, there is disclosed a technology of executing automated driving control in any one control mode between a predetermined standard control mode, and a specific control mode different from the standard control mode (for example, refer to Patent Document 1).

CITATION LIST

Patent Literature

[Patent Document 1]
Japanese Unexamined Patent Application, First Publication No. 2015-89801

SUMMARY OF INVENTION

Technical Problem

There is a concern that mode switching of automated driving or switching from the automated driving to manual driving may occur at a timing at which it is not intended by a vehicle occupant. At this time, even if the vehicle occupant is aware of that the switching has occurred, the vehicle occupant may not take an action for avoiding the switching in some cases.

The invention has been made in consideration of such circumstances, and an object thereof is to realize a configuration in which a vehicle occupant is notified of information of a specific site at which switching of the automated driving frequently occurs in advance so that the vehicle occupant can take various actions.

Solution to Problem

According to a first aspect of the invention, there is provided a vehicle control system including: a recognition unit that is configured to recognize a peripheral situation of a subject vehicle; an automated driving control unit that is configured to execute a plurality of driving modes including an automated driving mode of automatically performing at least one of speed control and steering control of the subject vehicle, and is configured to switch a driving mode that is executed on the basis of the peripheral situation recognized by the recognition unit; a communication unit that is configured to transmit information related to switching sites switched to a driving mode in which the degree of automated driving is low by the automated driving mode control unit on the basis of the peripheral situation recognized by the recognition unit to an external device, and receive information related to a specific site derived on the basis of the information related to the switching sites, which is collected from vehicles, from the external device; and an information providing unit that is configured to output predetermined information in a case where the subject vehicle approaches the specific site indicated by the information related to the specific site which is received by the communication unit.

According to a second aspect of the invention, in the vehicle control system according to the first aspect, the automated driving control unit is configured to switch the driving mode that is executed on the basis of the information related to the specific site which is received by the communication unit.

According to a third aspect of the invention, the vehicle control system according to the first or second aspect further includes a map edition unit that is configured to add position information of the specific site, which is indicated by the information that relates to the specific site and is received by the communication unit, to map information.

According to a fourth aspect of the invention, in the vehicle control system according to the first or second aspect, the external device is configured to derive a position of the specific site on the basis of the information related to the switching sites which is collected from the vehicles, and add derived position information of the specific site to map information that is retained by the external device, and the information related to the specific site which is received by the communication unit is information obtained by adding the position information of the specific site to a part or the entirety of the map information that is retained by the external device.

According to a fifth aspect of the invention, in the vehicle control system according to any one of the first to third aspects, the information related to the switching sites includes information indicating whether or not each of the vehicles performs switching of the driving mode at each of the switching sites, the external device is configured to derive an index based on a numerical value obtained by statistic calculation of presence or absence of the driving mode switching for each of the switching sites, determine a site at which the index derived for each of the switching sites is greater than a threshold value as the specific site, and transmit information related to the determined specific site to the communication unit.

According to a sixth aspect of the invention, there is provided a vehicle control method that allows an in-vehicle computer to: recognize a peripheral situation of a subject vehicle; execute a plurality of driving modes including an automated driving mode of automatically performing at least one of speed control and steering control of the subject vehicle; switch a driving mode that is executed on the basis of the recognized peripheral situation; transmit information related to switching sites switched to a driving mode in which the degree of automated driving is low on the basis of the recognized peripheral situation to an external device, and receive information related to a specific site derived on the basis of the information related to the switching sites, which is collected from vehicles, from the external device; and output predetermined information in a case where the subject vehicle approaches the specific site indicated by the received information related to the specific site.

According to a seventh aspect of the invention, there is provided a vehicle control program that is configured to allow an in-vehicle computer to execute: processing of recognizing a peripheral situation of a subject vehicle; processing of executing a plurality of driving modes including an automated driving mode of automatically performing at least one of speed control and steering control of the subject vehicle; processing of switching a driving mode that is executed on the basis of the recognized peripheral situation; processing of transmitting information related to switching sites switched to a driving mode in which the degree of automated driving is low on the basis of the recognized peripheral situation to an external device, and of receiving information related to a specific site derived on the basis of the information related to the switching sites, which is collected from vehicles, from the external device; and processing of outputting predetermined information in a case where the subject vehicle approaches the specific site indicated by the received information related to the specific site.

Advantageous Effects of Invention

According to the first and third to seventh aspects, it is possible to realize a configuration in which a vehicle occupant is notified of information of a specific site at which switching of the automated driving frequently occurs in advance so that the vehicle occupant can take various actions.

According to the second aspect, in a situation capable of continuing a mode in which the degree of automated driving is high, it is possible to perform switching to a mode in which the degree of automated driving is low in advance with reference to position information of a specific site before reaching the specific site, and thus the vehicle occupant can take various actions with leeway.

BRIEF DESCRIPTION OF DRAWINGS

FIG. 13 is a view showing an example of mode-specific operation availability information 188.

FIG. 14 is a view showing an example of vehicle-specific mode switching information.

DESCRIPTION OF EMBODIMENTS

Hereinafter, an embodiment of a vehicle control system, a vehicle control method, and a vehicle control program of the invention will be described with reference to the accompanying drawings.

Figure 1:
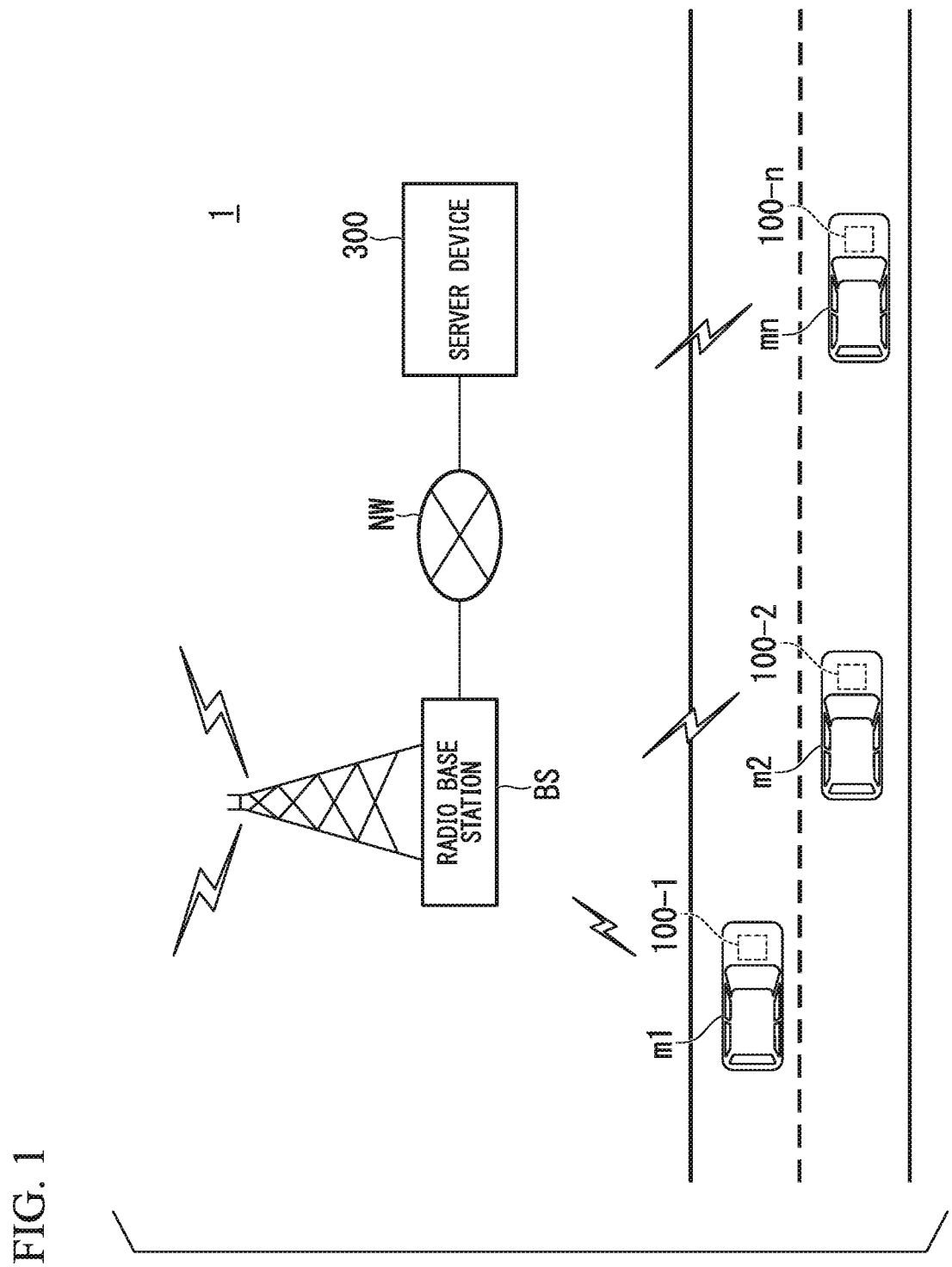
FIG. 1 is a view schematically showing an overall configuration of a communication system 1 including a vehicle control system according to an embodiment.

FIG. 1 is a view schematically showing an overall configuration of a communication system 1 including a vehicle control system according to an embodiment. For example, the communication system 1 includes vehicle control systems 100-1 to 100-n which are respectively mounted on vehicles, and a server device 300. In the following description, in a case where the vehicle control systems 100-1 to 100-n are not particularly discriminated, the vehicle control systems 100-1 to 100-n are simply called a vehicle control system 100.

The vehicle control system 100 performs communication with the server device 300, for example, through a radio base station BS. For example, radio communication using a mobile phone network and the like is performed between the vehicle control system 100 and the radio base station BS, and wired communication using a network NW such as a wide area network (WAN) and the like is performed between the radio base station BS and the server device 300. Furthermore, communication may be performed between the vehicle control system 100 and the server device 300 by using a road side device provided on the roadside, and the like.

Figure 2:
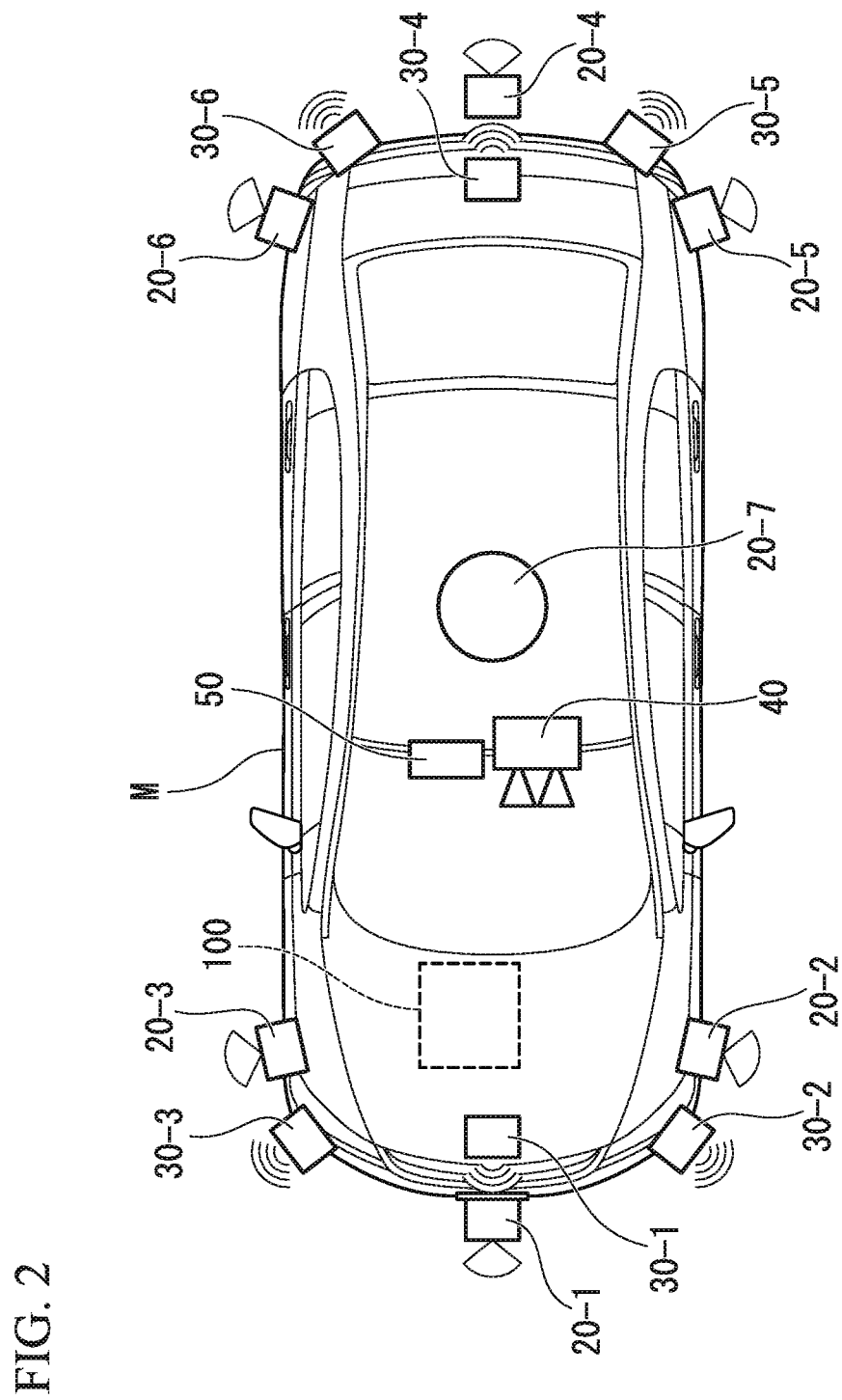
FIG. 2 is a view showing constituent elements of a subject vehicle M.

FIG. 2 is a view showing constituent elements of a vehicle (hereinafter, referred to as "subject vehicle M") in which a vehicle control system 100 of this embodiment is mounted. For example, a vehicle in which the vehicle control system 100 is mounted is a two-wheeled vehicle, a three-wheeled vehicle, a four-wheeled vehicle, or the like, and may be a vehicle that uses an internal combustion engine such as a diesel engine and a gasoline engine as a power source, an electric vehicle that uses an electric motor as the power source, a hybrid vehicle including both the internal combustion engine and the electric motor, or the like. In addition, for example, the above-described electric vehicle is driven by using electric power that is discharged from a battery such as a secondary battery, a hydrogen fuel cell, a metallic fuel cell, and an alcohol fuel cell.

As shown in FIG. 2, sensors such as finders 20-1 to 20-7, radars 30-1 to 30-6, and a camera 40, a navigation device 50, and the vehicle control system 100 are mounted on the subject vehicle M.

For example, the finders 20-1 to 20-7 are a light detection and ranging or a laser imaging detection and ranging (LIDAR) that measures scattered light with respect to irradiation light and measures a distance to a target. For example, the finder 20-1 is attached to a front grille and the like, and the finders 20-2 and 20-3 are attached to a lateral surface of a vehicle body, a door mirror, the inside of a headlight, the vicinity of a side lamp, and the like. The finder 20-4 is attached to a trunk lid, and the like, and the finders 20-5 and 20-6 are attached to a lateral surface of the vehicle body, the inside of a tail lamp, and the like. For example, the above-described finders 20-1 to 20-6 have a detection region of approximately 150° with respect to a horizontal direction. In addition, the finder 20-7 is attached to a roof and the like. For example, the finder 20-7 has a detection region of 360° with respect to the horizontal direction.

For example, the above-described radars 30-1 and 30-4 are long range millimeter wave radars in which a detection region in a depth direction is wider in comparison to other radars. In addition, the radars 30-2, 30-3, 30-5, and 30-6 are intermediate range millimeter radars in which a detection region in the depth direction is narrower in comparison to the radars 30-1 and 30-4.

Hereinafter, in a case where the finders 20-1 to 20-7 are not particularly discriminated, the finders 20-1 to 20-7 are simply described as "finder 20". In a case where the radars 30-1 to 30-6 are not particularly discriminated, the radars 30-1 to 30-6 are simply described as "radar 30". For example, the radar 30 detects an object by a frequency modulated continuous wave (FM-CW) method.

For example, the camera 40 is a digital camera that uses an individual imaging element such as a charge coupled device (CCD) and a complementary metal oxide semiconductor (CMOS). The camera 40 is attached to an upper side of a front windshield, a rear surface of a rearview mirror, and the like. For example, the camera 40 periodically and repetitively captures an image of the area in front of the subject vehicle M. The camera 40 may be a stereo camera including a plurality of cameras.

Furthermore, the configurations shown in FIG. 2 are illustrative only, and parts of the configurations may be omitted or other configurations may be added.

Figure 3:
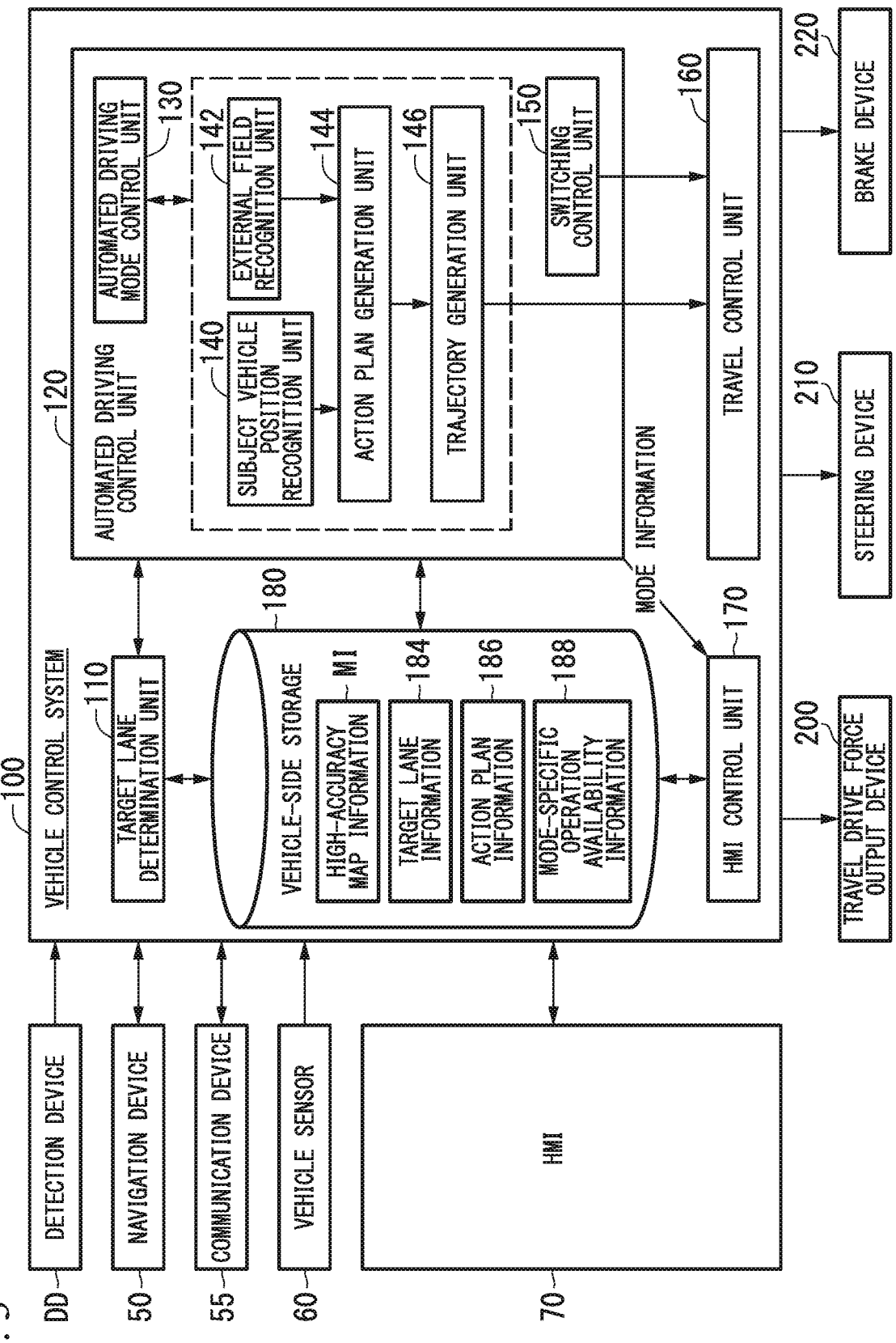
FIG. 3 is a functional configuration diagram with a focus on a vehicle control system 100.

FIG. 3 is a functional configuration diagram with a focus on the vehicle control system 100 according to this embodiment. A detection device DD including the finder 20, the radar 30, the camera 40, and the like, the navigation device 50, a vehicle-side communication device 55, a vehicle sensor 60, a human machine interface (HMI) 70, the vehicle control system 100, a travel drive force output device 200, a steering device 210, and a brake device 220 are mounted on the subject vehicle M. The devices or apparatus are connected to each other through a multiplex communication line such as a controller area network (CAN) communication line, a serial communication line, a radio communication network, and the like. Furthermore, a vehicle control system in the appended claims does not represent only the "vehicle control system 100", and may include a configuration (the detection device DD, the HMI 70, and the like) other than the vehicle control system 100.

The navigation device 50 includes global navigation satellite system (GNSS) receiver and map information (navigation map), a touch panel type display that functions as a user interface, a speaker, a microphone, and the like. The navigation device 50 specifies a position of the subject vehicle M by the GNSS receiver, and derives a route from the position to a destination that is designated by a user. The route derived by the navigation device 50 is provided to a target lane determination unit 110 of the vehicle control system 100. The position of the subject vehicle M may be specified or supplemented by an inertial navigation system (INS) that uses an output of the vehicle sensor 60. In addition, when the vehicle control system 100 executes a manual driving mode, the navigation device 50 performs guidance with respect to the route to the destination with voice or navigation display. Furthermore, the configuration that specifies the position of the subject vehicle M may be provided independently from the navigation device 50. In addition, the navigation device 50 may be realized, for example, by a function of a terminal device such as a smart phone and a tablet terminal which are carried by a user. In this case, information is transmitted and received between the terminal device and the vehicle control system 100 by radio communication or wired communication.

For example, the vehicle-side communication device 55 performs radio communication using a cellular network, a Wi-Fi network, Bluetooth (registered trademark), dedicated short range communication (DSRC), and the like. For example, the vehicle-side communication device 55 performs radio communication with an information providing server of a system such as a Vehicle Information and Communication System (VICS (registered trademark)) that monitors the traffic situation of a road, and acquires information (hereinafter, referred to as "traffic information") indicating a traffic situation of a road on which the subject vehicle M travels or a scheduled travel road. The traffic information includes information such as forward traffic jam information, time required to pass through a traffic jam site, accident/disabled car/construction information, speed regulation/lane regulation information, information on a position of a parking lot and whether or not a parking lot/service area/parking area is full or has space. In addition, the vehicle-side communication device 55 may acquire the traffic information by performing communication with a radio beacon provided in a side shoulder of a road, or by performing vehicle-to-vehicle communication with another vehicle that travels at the periphery of the subject vehicle M. The vehicle-side communication device 55 is an example of a "communication unit".

In addition, the vehicle-side communication device 55 performs communication with the server device 300, and receives high-accuracy map information MI including information related to a specific site, or information related to the specific site. The specific site is a site at which the subject vehicle M or another vehicle in the communication system 1 switches an automated driving mode to be described later to a mode in which the degree of automated driving is lower. For example, the information related to the specific site may be expressed with position information such as three-dimensional coordinate including a longitude, a latitude, and a height, may be represented by a lane in an arbitrary travel section, or relative position information with an existing target such as a junction and a branch point set as a reference. Details of the specific site will be described later.

The vehicle sensor 60 includes a vehicle speed sensor that determines a vehicle speed, an acceleration sensor that determines acceleration, a yaw rate sensor that determines an angular velocity around a vertical axis, an orientation sensor that determines a direction of the subject vehicle M, and the like.

Figure 4:
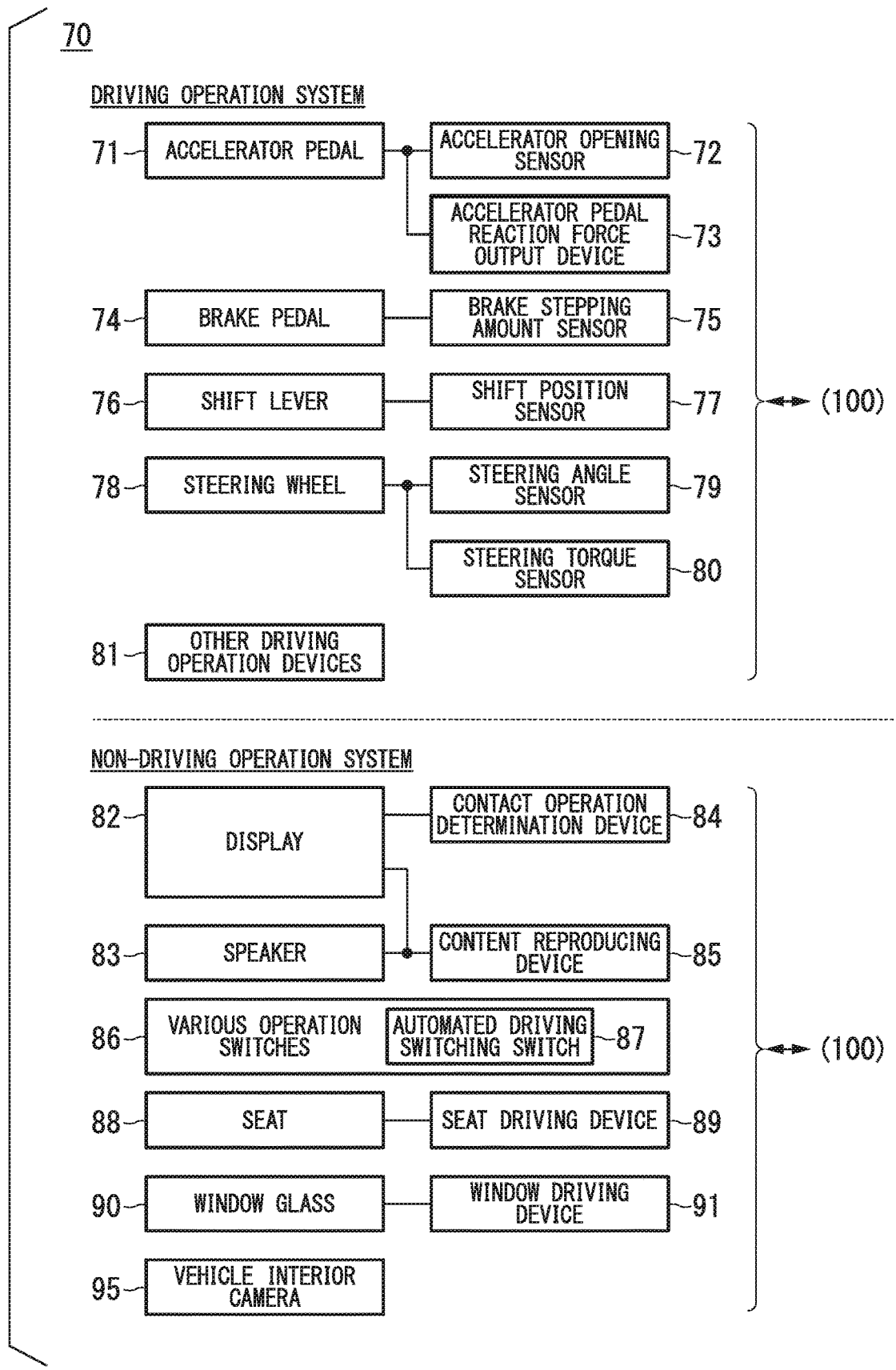
FIG. 4 is a configuration diagram of an HMI 70.

FIG. 4 is a configuration diagram of the HMI 70. For example, the HMI 70 includes a configuration of a driving operation system, and a configuration of a non-driving operation system. A boundary thereof is not clear, and the configuration of the driving operation system may include a function of the non-driving operation system (or vice versa).

For example, the HMI 70 includes an accelerator pedal 71, an accelerator opening sensor 72, an accelerator pedal reaction force output device 73, a brake pedal 74, a brake stepping amount sensor (or a master pressure sensor and the like) 75, a shift lever 76, a shift position sensor 77, a steering wheel 78, a steering angle sensor 79, a steering torque sensor 80, and other driving operation devices 81 as the configuration of the driving operation system.

The accelerator pedal 71 is an operator that accepts an acceleration instruction (or a deceleration instruction by a return operation) by the vehicle occupant. The accelerator opening sensor 72 determines a stepping amount of the accelerator pedal 71, and outputs an accelerator opening signal indicating the stepping amount to the vehicle control system 100. Furthermore, the accelerator opening signal may be directly output to the travel drive force output device 200, the steering device 210, or the brake device 220 instead of being output to the vehicle control system 100. This is also true of configurations of other driving operation systems to be described below. For example, the accelerator pedal reaction force output device 73 outputs a force (operation reaction force) in a direction opposite to an operation direction with respect to the accelerator pedal 71 in correspondence with an instruction from the vehicle control system 100.

The brake pedal 74 is an operator that accepts a deceleration instruction by the vehicle occupant. The brake stepping amount sensor 75 determines a stepping amount (or a stepping force) of the brake pedal 74, and outputs a brake signal indicating a determination result to the vehicle control system 100.

The shift lever 76 is an operator that accepts a shift stage change instruction by the vehicle occupant. The shift position sensor 77 detects a shift stage instructed by the vehicle occupant, and outputs a shift position signal indicating a detection result to the vehicle control system 100.

The steering wheel 78 is an operator that accepts a turning instruction by the vehicle occupant. The steering angle sensor 79 determines an operation angle of the steering wheel 78, and outputs a steering angle signal indicating a determination result to the vehicle control system 100. The steering torque sensor 80 determines the torque applied to the steering wheel 78, and outputs a steering torque signal indicating a determination result to the vehicle control system 100.

Examples of the other driving operation devices 81 include a joy stick, a button, a dial switch, a graphical user interface (GUI) switch, and the like. The other driving operation devices 81 accept an acceleration instruction, a deceleration instruction, a turning instruction, and the like, and output the instructions to the vehicle control system 100.

For example, the HMI 70 includes a display 82, a speaker 83, a contact operation determination device 84, a content reproducing device 85, various operation switches 86, a seat 88, a seat driving device 89, a window glass 90, a window driving device 91, and a vehicle interior camera 95 as the configuration of the non-driving operation system.

Examples of the display 82 include a liquid crystal display (LCD), an organic electroluminescence (EL) display, and the like which are attached to respective portions of an instrument panel, an arbitrary site that faces the passenger's seat or a rear seat, and the like. In addition, the display 82 may be a head-up display (HUD) that projects an image on a front windshield or another window. The speaker 83 outputs a voice. In a case where the display 82 is a touch panel, the contact operation determination device 84 determines a contact position (touch position) on a display screen of the display 82, and outputs the contact position to the vehicle control system 100. Furthermore, in a case where the display 82 is not the touch panel, the contact operation determination device 84 may be omitted.

For example, the content reproducing device 85 includes a digital versatile disc (DVD) reproducing device, a compact disc (CD) reproducing device, a television receiver, a generation device of various guidance images, and the like. One or all of the display 82, the speaker 83, the contact operation determination device 84, and the content reproducing device 85 may be common to the navigation device 50.

The various operation switches 86 are disposed at an arbitrary site on a vehicle interior side. The various operation switches 86 include an automated driving switching switch 87 that gives an instruction of initiation (or initiation in the future) and stoppage of automated driving. The automated driving switching switch 87 may be any one of a graphical user interface (GUI) switch and a mechanical switch. In addition, the various operation switches 86 may include a switch that drives the seat driving device 89 or the window driving device 91.

The seat 88 is a seat in which the vehicle occupant sits. The seat driving device 89 freely drives a reclining angle, a position in a front and rear direction, a yaw angle of the seat 88, and the like. For example, the window glass 90 is provided in respective doors. The window driving device 91 performs opening/closing operation of the window glass 90.

The vehicle interior camera 95 is a digital camera that uses an individual imaging element such as a CCD and CMOS. The vehicle interior camera 95 is attached to a position such as a rearview mirror, a steering boss portion, and an instrument panel at which an image of at least the head of the vehicle occupant who performs a driving operation can be captured. For example, the camera 40 periodically and repetitively captures an image of the vehicle occupant.

Furthermore, the navigation device 50 or the vehicle-side communication device 55, which is described as a configuration other than a configuration of the HMI 70, may be included in the non-driving operation system of the HMI 70.

The travel drive force output device 200, the steering device 210, and the brake device 220 will be described prior to description of the vehicle control system 100.

The travel drive force output device 200 outputs a travel drive force (torque) necessary for driving of a vehicle to drive wheels. For example, the travel drive force output device 200 includes an engine, a transmission, and an engine electronic control unit (ECU) that controls the engine in a case where the subject vehicle M is a vehicle that uses an internal combustion engine as a power source, a travel motor and a motor ECU that controls the travel motor in a case where the subject vehicle M is an electric vehicle that uses an electric motor as the power source, or the engine, the transmission, the engine ECU, the travel motor, and the motor ECU in a case where the subject vehicle M is a hybrid vehicle. In a case where the travel drive force output device 200 includes only the engine, the engine ECU adjusts a throttle opening of the engine, a shift stage, and the like in accordance with information input from a travel control unit 160 to be described later. In addition, in a case where the travel drive force output device 200 includes only the travel motor, the motor ECU adjusts a duty ratio of a PWM signal that is applied to the travel motor in accordance with information input from the travel control unit 160. In addition, in a case where the travel drive force output device 200 includes both the engine and the travel motor, the engine ECU and the motor ECU control the travel drive force in cooperation with each other in accordance with information input from the travel control unit 160.

For example, the steering device 210 includes a steering ECU, and an electric motor. For example, the electric motor applies a force to a rack and pinion mechanism to change a direction of a steering wheel. The steering ECU drives the electric motor in accordance with information input from the vehicle control system 100, or information of a steering angle or steering torque which is input to change the direction of the steering wheel.

For example, the brake device 220 is an electric servo-brake device including a brake caliper, a cylinder that transmits a hydraulic pressure to the brake caliper, an electric motor that generates the hydraulic pressure in the cylinder, and a braking control unit. The braking control unit of the electric servo-brake device controls the electric motor in accordance with information input from the travel control unit 160 to allow brake torque corresponding to a braking operation to be output to respective wheels. The electric servo-brake device may include a mechanism that transmits a hydraulic pressure generated by an operation of the brake pedal to the cylinder through a master cylinder as a backup mechanism. Furthermore, the brake device 220 may be an electronic control type hydraulic brake device without limitation to the above-described electric servo-brake device. The electronic control type hydraulic brake device controls an actuator in accordance with information input from the travel control unit 160 to transmit a hydraulic pressure of the master cylinder to the cylinder. In addition, the brake device 220 may include a regenerative brake realized by a travel motor that can be included in the travel drive force output device 200.

[Vehicle Control System]

Hereinafter, the vehicle control system 100 will be described. The vehicle control system 100 is realized, for example, by one or more processors or hardware having an equivalent function. The vehicle control system 100 may have a configuration in which an electronic control unit (ECU) in which a processor such as a central processing unit (CPU), a storage, and a communication interface are connected to each other by an internal bus, a micro-processing unit (MPU), and the like are combined with each other.

Returning to FIG. 3, the vehicle control system 100 includes, for example, the target lane determination unit 110, an automated driving control unit 120, a travel control unit 160, an HMI control unit 170, and a vehicle-side storage 180. For example, the automated driving control unit 120 includes an automated driving mode control unit 130, a subject vehicle position recognition unit 140, an external field recognition unit 142, an action plan generation unit 144, a trajectory generation unit 146, and a switching control unit 150. A combination of the detection device DD, the vehicle-side communication device 55, and the external field recognition unit 142 is an example of a "recognition unit".

Some or all of the target lane determination unit 110, the respective units of the automated driving control unit 120, and the travel control unit 160 are realized when a processor executes a program (software). In addition, some or all of the units may be realized by hardware such as large scale integration (LSI) and an application specific integrated circuit (ASIC), or may be realized by a combination of software and the hardware.

For example, information such as high-accuracy map information MI, target lane information 184, action plan information 186, and mode-specific operation availability information 188 is stored in the vehicle-side storage 180. The vehicle-side storage 180 is realized by a read only memory (ROM), a random access memory (RAM), a hard disk drive (HDD), a flash memory, and the like. The program that is executed by the processor may be stored in the vehicle-side storage 180 in advance, or may be downloaded from an external device through in-vehicle Internet equipment, and the like. In addition, the program may be installed in the vehicle-side storage 180 when a portable storage medium that stores the program is mounted in a drive device (not shown). In addition, the vehicle control system 100 may be dispersed among a plurality of computer devices.

For example, the target lane determination unit 110 is realized by an MPU. The target lane determination unit 110 divides a route provided form the navigation device 50 into a plurality of blocks (for example, divides the route for every 100 [m] in a vehicle advancing direction), and determines a target lane for every block with reference to the high-accuracy map information MI. For example, the target lane determination unit 110 makes a determination on regarding which lane from the left to travel in. For example, in a case where there are a branch site, a merging site, and the like on the route, the target lane determination unit 110 determines a target lane so that the subject vehicle M can travel along a reasonable travel route to advance to a branch destination. The target lane determined by the target lane determination unit 110 is stored in the vehicle-side storage 180 as the target lane information 184.

The high-accuracy map information MI is map information with higher accuracy in comparison to a navigation map included in the navigation device 50. For example, the high-accuracy map information MI includes information of the center of the lane, information of a boundary of the lane, and the like. In addition, the high-accuracy map information MI includes road information, traffic regulation information, address information (addresses, postal codes), facility information, telephone number information, and the like. The road information includes information indicating a road type such as an expressway, a toll road, a national road, and a prefectural road, and information such as the number of lanes of a road, a width of each lane, a gradient of a road, a position of a road (three-dimensional coordinates including a longitude, a latitude, and height), a curvature of a curve of a lane, a position of a merging point and a branch point of lanes, and a sign installed on the road. The traffic regulation information includes information indicating a situation in which lanes are blocked due to construction, traffic accidents, a traffic jam, and the like. In addition, the high-accuracy map information MI may include information related to a specific site.

The automated driving mode control unit 130 determines a mode of automated driving that is performed by the automated driving control unit 120. The mode of the automated driving in this embodiment includes the following modes. Furthermore, the following description is illustrative only, and the number of modes of automated driving may be determined in an arbitrary manner.

[Mode A]

A mode A is a mode in which the degree of automated driving is highest. In a case where the mode A is performed, the entirety of vehicle control such as complicated merging control is automatically performed, and thus it is not necessary for a vehicle occupant to monitor the periphery or a state of the subject vehicle M (peripheral monitoring duty does not occur).

Here, as an example of a travel aspect that is selected in the mode A, there is low-speed following travel (traffic jam pilot (TJP)) that follows a preceding vehicle during traffic jam. In the low-speed following travel, stable automated driving can be realized by following a preceding vehicle on a congested expressway. The low-speed following travel is released, for example, in a case where a travel speed of the subject vehicle M becomes equal to or greater than a predetermined speed (for example, 60 km/h). In addition, the mode A is switched to another travel aspect at a termination timing of the low-speed following travel in some cases, but switching may be performed to another travel aspect capable of being selected in the mode A.

[Mode B]

A mode B is a mode in which the degree of automated driving is high next to the mode A. In a case where the mode B is performed, principally, the entirety of vehicle control is automatically performed, but a driving operation of the subject vehicle M is delegated to the vehicle occupant in correspondence with a situation. According to this, it is necessary for the vehicle occupant to monitor the periphery or the state of the subject vehicle M (peripheral monitoring duty further increases in comparison to the mode A).

[Mode C]

A mode C is a mode in which the degree of automated driving is high next to the mode B. In a case where mode C is performed, it is necessary for the vehicle occupant to perform a confirmation operation corresponding to a situation with respect to the HMI 70. In the mode C, for example, in a case where the vehicle occupant is notified of a lane changing timing, and the vehicle occupant performs an operation of instructing the HMI 70 to change lanes, automatic lane changing is performed. According to this, it is necessary for the vehicle occupant to monitor the periphery or the state of the subject vehicle M.

The automated driving mode control unit 130 determines the mode of the automated driving to any one of the modes on the basis of an operation by the vehicle occupant with respect to the HMI 70, an event determined by the action plan generation unit 144, a travel aspect determined by the trajectory generation unit 146, and the like. The HMI control unit 170 is notified of the mode of the automated driving. In addition, a limit corresponding to a performance of the detection device DD of the subject vehicle M, and the like may be set to the mode of the automated driving. For example, in a case where the performance of the detection device DD is low, the mode A may not be performed.

In any automated driving mode, switching to manual driving mode (overriding) can be performed by an operation with respect to a configuration of the driving operation system in the HMI 70. For example, the overriding is initiated in a case where a state in which an operation force by the vehicle occupant of the subject vehicle M with respect to the driving operation system of the HMI 70 is greater than a threshold value continues for a predetermined time or longer, the operation is equal to or greater than a predetermined operation variation amount (for example, an accelerator opening of the accelerator pedal 71, a brake stepping amount of the brake pedal 74, a steering angle of the steering wheel 78), the operation with respect to the driving operation system is performed a predetermined number of times or greater, and the like.

In addition, in a case where a specific site exists in a range of a predetermined distance (for example, a distance that is several times a detection range of respective sensors) from a position of the subject vehicle M which is recognized by the subject vehicle position recognition unit 140, the automated driving mode control unit 130 may switch the automated driving mode to a mode in which the degree of automated driving is lower before the subject vehicle M reaches the specific site with reference to the high-accuracy map information MI.

The subject vehicle position recognition unit 140 of the automated driving control unit 120 recognizes a lane (travel lane) in which the subject vehicle M travels, and a relative position of the subject vehicle M with respect to the travel lane on the basis of the high-accuracy map information MI stored in the vehicle-side storage 180, and information input from the finder 20, the radar 30, the camera 40, the navigation device 50, or the vehicle sensor 60.

For example, the subject vehicle position recognition unit 140 recognizes the travel lane by comparing a pattern of a road partition line (for example, an arrangement of a solid line and a broken line) that is recognized from the high-accuracy map information MI, and a pattern of a load partition line near the subject vehicle M that is recognized from an image captured by the camera 40. In the recognition, a position of the subject vehicle M which is acquired from the navigation device 50, or a processing result by the INS may be added.

Figure 5:
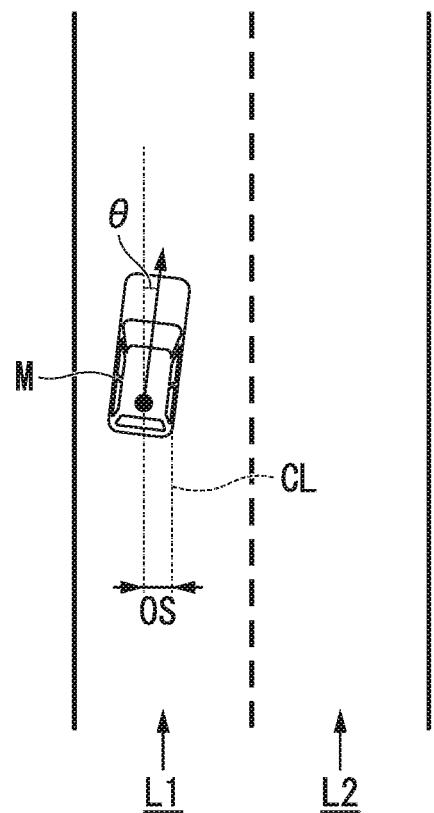
FIG. 5 is a view showing an aspect in which a relative position of the subject vehicle M with respect to a travel lane L1 is recognized by a subject vehicle position recognition unit 140.

FIG. 5 is a view showing an aspect in which a relative position of the subject vehicle M with respect to a travel lane L1 is recognized by the subject vehicle position recognition unit 140. For example, the subject vehicle position recognition unit 140 recognizes a deviation OS of a reference point (for example, the center of gravity) of the subject vehicle M from the travel lane center CL, and an angle θ of an advancing direction of the subject vehicle M with respect to a line obtained by connecting travel lane centers CL as a relative position of the subject vehicle M with respect to the travel lane L1. Furthermore, alternatively, the subject vehicle position recognition unit 140 may recognize a position of the reference point of the subject vehicle M with respect to any lateral end of the subject vehicle lane L1, and the like as the relative position of the subject vehicle M with respect to the travel lane. The relative position of the subject vehicle M which is recognized by the subject vehicle position recognition unit 140 is provided to the target lane determination unit 110.

The external field recognition unit 142 recognizes a state such as a position, a speed, and an acceleration of a nearby vehicle on the basis of information input from the finder 20, the radar 30, the camera 40, and the like. For example, the nearby vehicle is a vehicle that travels near the subject vehicle M and travels in the same direction as the subject vehicle M. The position of the nearby vehicle may be indicated as a representative point such as the center of gravity and a corner of another vehicle, or may be indicated as a region that is expressed as a contour of the other vehicle. The "state" of the nearby vehicle may include an acceleration of the nearby vehicle, and whether or not the nearby vehicle is changing a lane (or whether or not the nearby vehicle intends to change lanes) which are understood on the basis of information of the various devices. In addition, the external field recognition unit 142 may recognize positions of a guard rail, an electric pole, a parked vehicle, a pedestrian, and other objects in addition to the nearby vehicle.

The action plan generation unit 144 sets a start point of the automated driving, and/or a destination of the automated driving. The start point of the automated driving may be a current position of the subject vehicle M, or a point at which an operation of instructing the automated driving is performed. The action plan generation unit 144 generates an action plan in a section between the start point and the destination of the automated driving. Furthermore, the action plan generation unit 144 may generates an action plan with respect to an arbitrary section without limitation to the above-described action plan.

For example, the action plan includes a plurality of events which are sequentially executed. Examples of the events include a deceleration event of decelerating the subject vehicle M, an acceleration event of accelerating the subject vehicle M, a lane keeping event of allowing the subject vehicle M to travel without deviating from a travel lane, a lane changing event of changing the travel lane, a passing event of allowing the subject vehicle M to pass a preceding vehicle, a branch event of changing a lane to a desired lane at a branch point or allowing the subject vehicle M to travel without deviating from the current travel lane, a merging event of accelerating or decelerating the subject vehicle M at a merging lane to be merged to a main lane, and changing a travel lane, an hand-over event of transitioning a manual driving mode to an automated driving mode at an initiation point of the automated driving, transitioning the automated driving mode to the manual driving mode at a scheduled termination point of the automated driving, or transitioning the automated driving mode to the manual driving mode during the automated driving, and the like. At a site at which a target lane determined by the target lane determination unit 110 is switched, the action plan generation unit 144 sets the lane changing event, the branch event, or the merging event. Information indicating an action plan generated by the action plan generation unit 144 is stored in the vehicle-side storage 180 as the action plan information 186.

Figure 6:
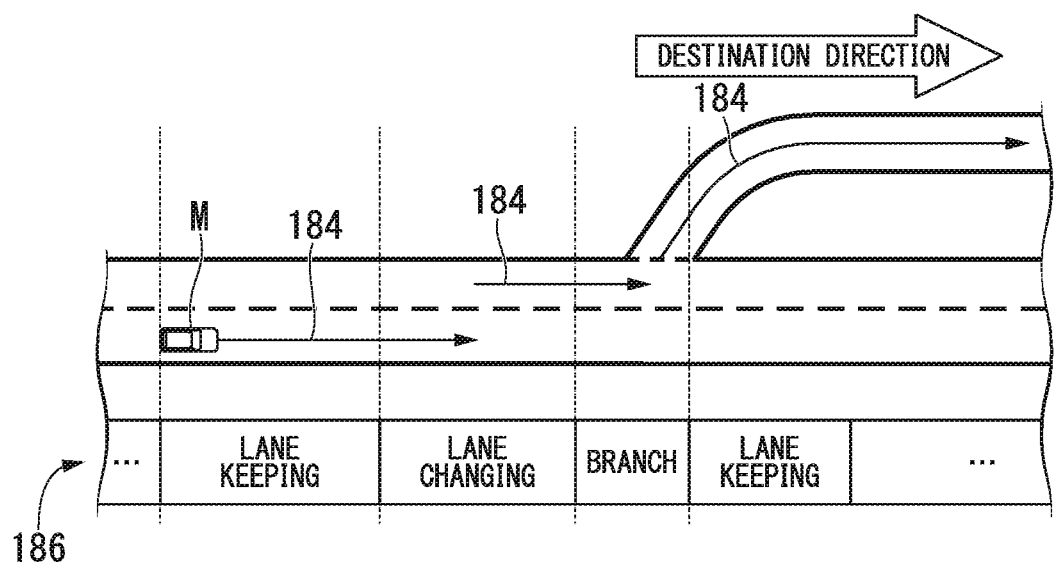
FIG. 6 is a view showing an example of an action plan that is generated with respect to an arbitrary section.

FIG. 6 is a view showing an example of an action plan that is generated with respect to an arbitrary section. As shown in FIG. 5, the action plan generation unit 144 generates an action plan that is necessary for the subject vehicle M to travel in a target lane indicated by the target lane information 184. Furthermore, the action plan generation unit 144 may dynamically change the action plan in correspondence with a situation variation of the subject vehicle M regardless of the target lane information 184. For example, in a case where a speed of a nearby vehicle recognized by the external field recognition unit 142 in travel exceeds a threshold value, or a movement direction of a nearby vehicle that travels in a lane adjacent to a subject lane faces a subject lane direction, the action plan generation unit 144 changes an event that is set in a driving section along which the subject vehicle M is scheduled to travel. For example, in a case where an event is set so that the lane changing event is executed after the lane keeping event, if it is determined by a recognition result of the external field recognition unit 142 that a vehicle advances at a speed equal to or higher than a threshold value from a backward side of a lane that is a lane changing destination during the lane keeping event, the action plan generation unit 144 changes an event subsequent to the lane keeping event from the lane changing event to the deceleration event, the lane keeping event, and the like. As a result, even in a case where a variation occurs in the external field state, the vehicle control system 100 can allow the subject vehicle M to stably perform automated driving.

Figure 7:
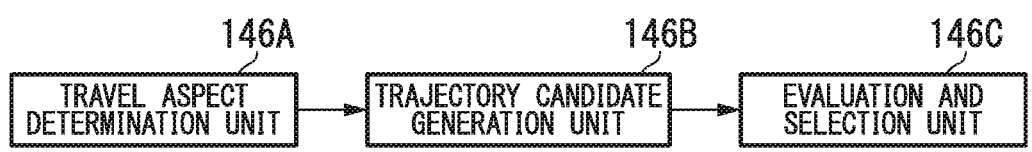
FIG. 7 is a view showing an example of a configuration of a trajectory generation unit 146.

FIG. 7 is a view showing an example of a configuration of the trajectory generation unit 146. For example, the trajectory generation unit 146 includes a travel aspect determination unit 146A, a trajectory candidate generation unit 146B, and an evaluation and selection unit 146C.

For example, when performing the lane keeping event, the travel aspect determination unit 146A determines any one travel aspect among constant speed travel, following travel, low-speed following travel, deceleration travel, curve travel, obstacle avoiding travel, and the like. For example, in a case where another vehicle does not exist in front of the subject vehicle M, the travel aspect determination unit 146A determines the travel aspect as the constant speed travel. In addition, in a case of performing the following travel with respect to a preceding vehicle, the travel aspect determination unit 146A determines that travel aspect as the following travel. In addition, in a traffic jam situation, and the like, the travel aspect determination unit 146A determines the travel aspect as the low-speed following travel. In addition, in a case where deceleration of a preceding vehicle is recognized by the external field recognition unit 142, or in a case of performing an event such as stopping and parking, the travel aspect determination unit 146A determines the travel aspect as the deceleration travel. In addition, in a case where the external field recognition unit 142 recognizes that the subject vehicle M reaches a curved road, the travel aspect determination unit 146A determines the travel aspect as the curve travel. In addition, in a case where the external field recognition unit 142 recognizes an obstacle in front of the subject vehicle M, the travel aspect determination unit 146A determines the travel aspect as the obstacle avoiding travel. In addition, in a case of performing the lane changing event, the passing event, the branch event, the merging event, the hand-over event, and the like, the travel aspect determination unit 146A determines a travel aspect in correspondence with each of the events.

In addition, for example, in a case where a speed of a nearby vehicle (for example, a preceding vehicle) recognized by the external field recognition unit 142 is equal to or less than a constant speed, and a vehicle-to-vehicle distance to the nearby vehicle is equal to or less than a constant value, in the mode A, the travel aspect determination unit 146A determines the travel aspect as the low speed following travel as an example. In addition, for example, in a case where the speed of a nearby vehicle (for example, the preceding vehicle) recognized by the external field recognition unit 142 is equal to or greater than a constant speed, and the vehicle-to-vehicle distance to the nearby vehicle is equal to or greater than a constant value, in the mode B, the travel aspect determination unit 146A determines the travel aspect as the constant speed travel as an example.

Figure 8:
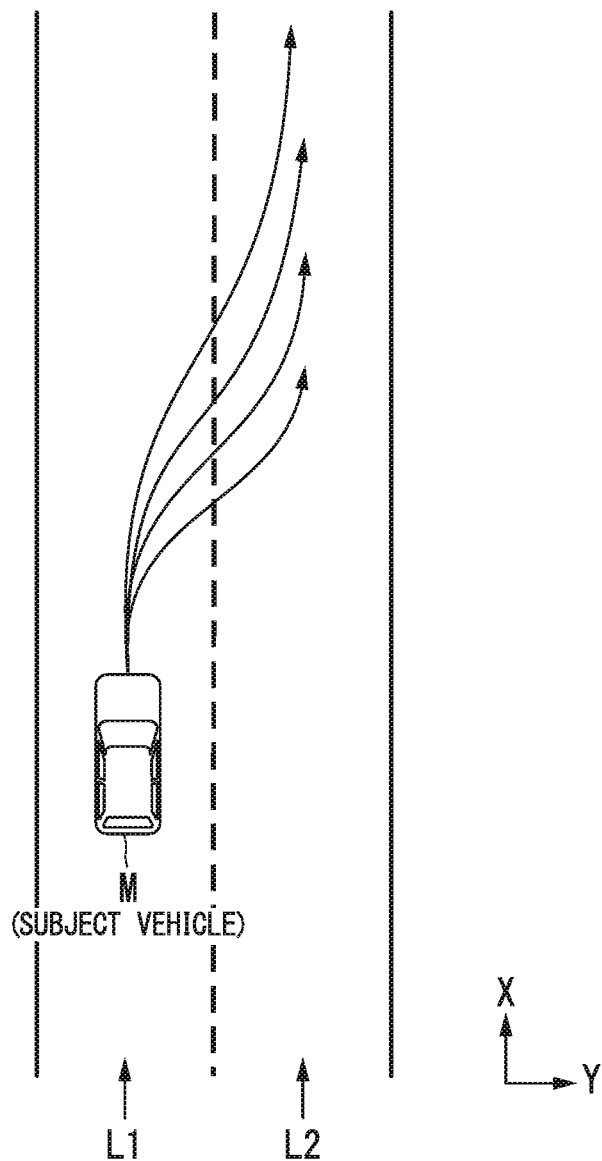
FIG. 8 is a view showing an example of a trajectory candidate that is generated by a trajectory candidate generation unit 146B.

The trajectory candidate generation unit 146B generates a trajectory candidate on the basis of a travel aspect determined by the travel aspect determination unit 146A. FIG. 8 is a view showing an example of a trajectory candidate generated by the trajectory candidate generation unit 146B. FIG. 8 shows the trajectory candidate that is generated in a case where the subject vehicle M changes a lane from a lane L1 to a lane L2.

Figure 9:
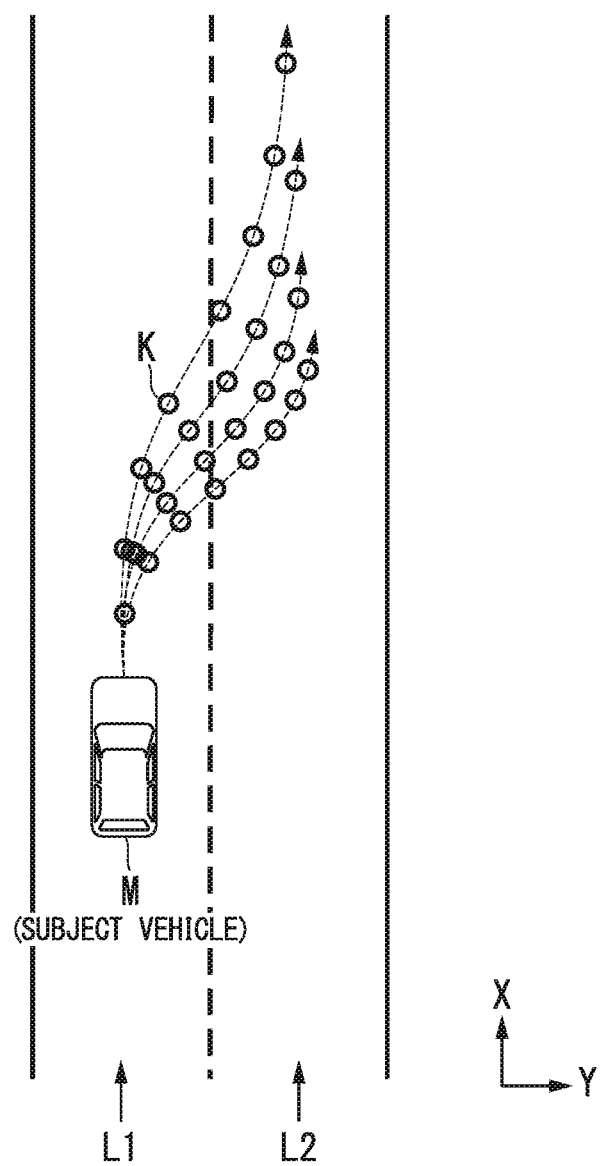
FIG. 9 is a view showing the trajectory candidate that is generated by the trajectory candidate generation unit 146B as a trajectory point K.

The trajectory candidate generation unit 146B determines trajectories shown in FIG. 8, for example, as a group of target positions (trajectory points K) in which a reference position (for example, the center of gravity or the center of a rear wheel axis) of the subject vehicle M is to reach for every predetermined time in the future. FIG. 9 is a view in which trajectory candidates generated by the trajectory candidate generation unit 146B are expressed as trajectory points K. As an interval between the trajectory points K is wider, a speed of the subject vehicle M is raised, and as the interval between the trajectory points K is narrower, the speed of the subject vehicle M is lowered. Accordingly, in a case of desiring to accelerate, the trajectory candidate generation unit 146B gradually widens the interval of the trajectory points K, and in a case of desiring to decelerate, the trajectory candidate generation unit 146B gradually narrows the intervals of the trajectory points.

As described above, since the trajectory points K include a speed component, it is necessary for the trajectory candidate generation unit 146B to apply a target speed to each of the trajectory points K. The target speed is determined by the travel aspect determined by the travel aspect determination unit 146A.

Figure 10:
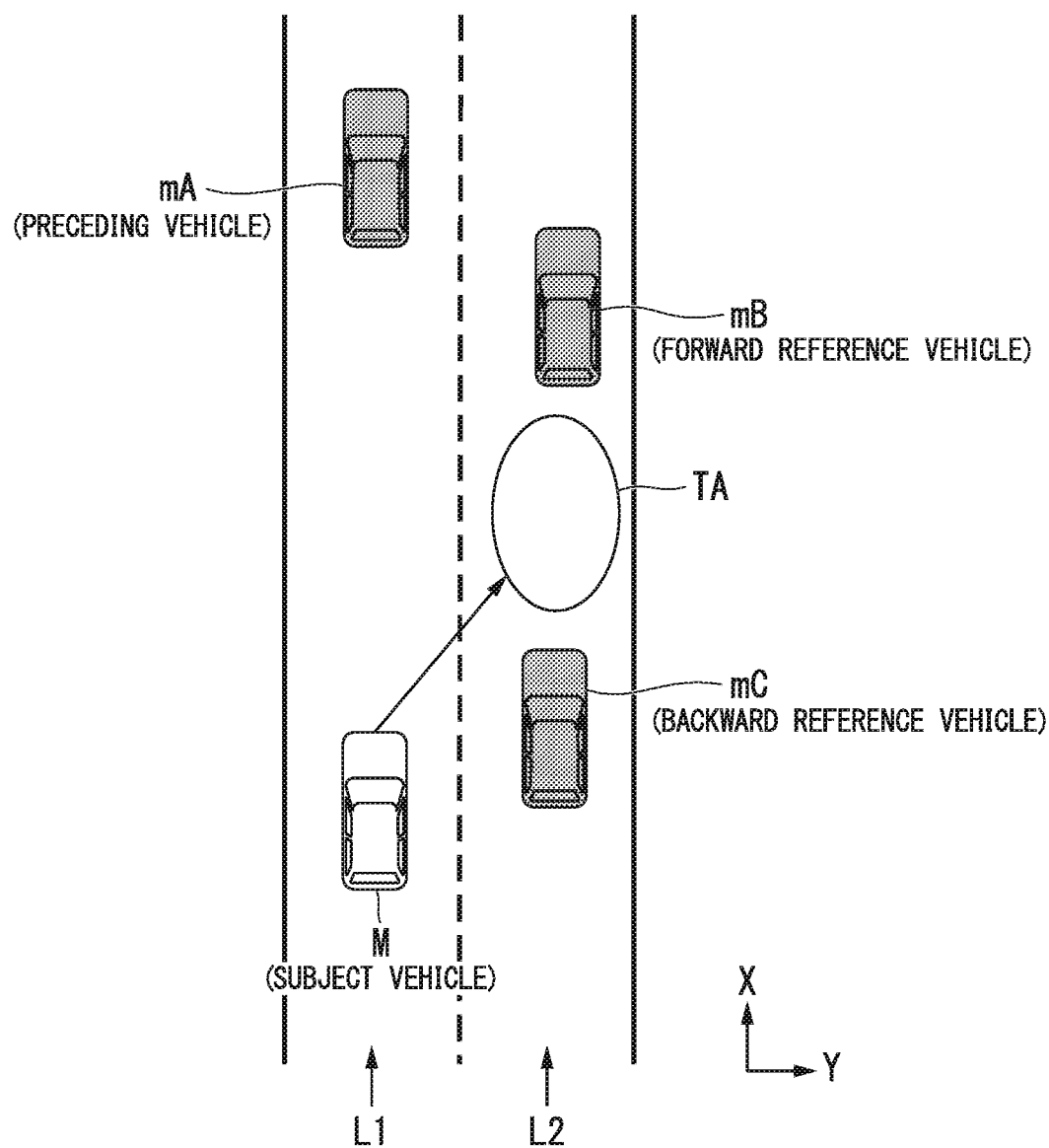
FIG. 10 is a view showing a lane changing target position TA.

Here, a description will be given of a method of determining a target speed in a case of performing lane changing (including branch). First, the trajectory candidate generation unit 146B sets a lane changing target position (or a merging target position). The lane changing target position is set as a relative position with a nearby vehicle, and corresponds to determination of "lane is to be changed with respect to which nearby vehicle". The trajectory candidate generation unit 146B determines a target speed in a case of performing lane changing with focus given to three nearby vehicles with a lane changing target position set as a reference. FIG. 10 is a view showing a lane changing target position TA. In the drawing, L1 represents a subject lane, and L2 represents a nearby lane. Here, a nearby vehicle that travels immediately in front of the subject vehicle M in the same lane as that of the subject vehicle M is defined as a preceding vehicle mA, a nearby vehicle that travels immediately in front of the lane changing target position TA is defined as a forward reference vehicle mB, and a nearby vehicle that travels immediately behind the lane changing target position TA is defined as a backward reference vehicle mC. It is necessary for the subject vehicle M to perform acceleration/deceleration to move to a lateral side of the lane changing target position TA, but it is necessary for the subject vehicle M to avoid catching up with the preceding vehicle mA. According to this, the trajectory candidate generation unit 146B predicts a future state of the three nearby vehicles, and determines the target speed so as not to interfere with the nearby vehicles.

Figure 11:
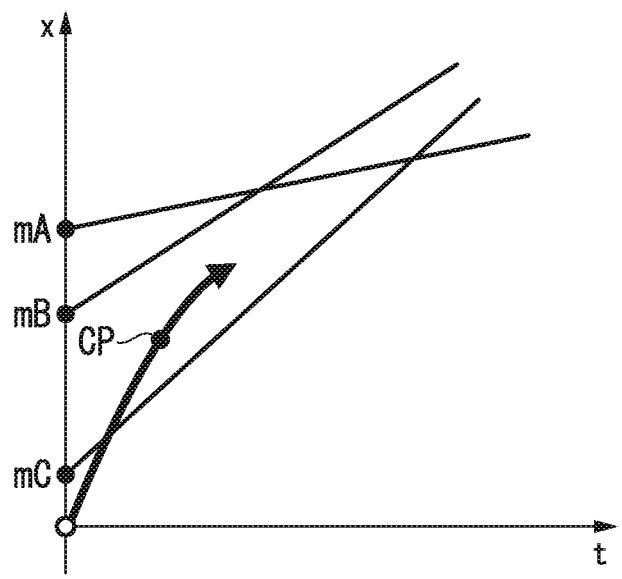
FIG. 11 is a view showing a speed generation model in a case where speeds of three nearby vehicles are assumed to be constant.

FIG. 11 is a view showing a speed generation model on the assumption that speeds of the three nearby vehicles are constant. In the drawing, straight lines, which extend from mA, mB, and mC, represent a displacement in an advancing direction on the assumption that the nearby vehicles travel at a constant speed. At a point CP at which lane changing is completed, it is necessary for the subject vehicle M to be present between the forward reference vehicle mB and the backward reference vehicle mC, and behind the preceding vehicle mA. Under the restriction, the trajectory candidate generation unit 146B derives a plurality of time-series patterns of a target speed until lane changing is completed. In addition, the time-series patterns of the target speed are applied to a model such as a spline curve to derive a plurality of the trajectory candidates as shown in FIG. 9. Furthermore, movement patterns of the three nearby vehicles may be predicted on the assumption of constant acceleration and constant jerk without limitation to the constant speed as shown in FIG. 11.

The evaluation and selection unit 146C performs evaluation with respect to the trajectory candidates generated by the trajectory candidate generation unit 146B, for example, from the two points of view of planning and stability, and selects a trajectory to be output to the travel control unit 160. For example, from the viewpoint of planning, in a case where trackability with respect to a plan (for example, an action plan) generated in advance is high and a total length of the trajectory is short, the trajectory is highly evaluated. For example, in a case where it is preferable to change a lane to the right, a trajectory in which a lane is changed to the left at once and returns is lowly evaluated. From the viewpoint of stability, for example, in each trajectory point, as a distance between the subject vehicle M and an object (a nearby vehicle and the like) is longer, a variation amount of acceleration or deceleration and a steering angel, and the like are smaller, the trajectory is highly evaluated.

The switching control unit 150 switches the automated driving mode and the manual driving mode from each other on the basis of a signal that is input from the automated driving switching switch 87, and the like. In addition, the switching control unit 150 switches the automated driving mode to the manual driving mode on the basis of an operation that gives an instruction for acceleration, deceleration, or steering with respect to a configuration of the driving operation system in the HMI 70. For example, in a case where a state, in which an operation amount indicated by a signal input from the configuration of the driving operation system in the HMI 70 exceeds a threshold value, continues for a reference time or longer, the switching control unit 150 switches the automated driving mode to the manual driving mode (overriding). In addition, after switching to the manual driving mode by the overriding, in a case where an operation with respect to the configuration of the driving operation system in the HMI 70 is not detected for a predetermined time, the switching control unit 150 may return the driving mode to the automated driving mode. In addition, for example, in a case of performing handover control of transitioning to the manual driving mode from the automated driving mode at a scheduled termination point of the automated driving, the switching control unit 150 outputs information indicating the gist to the HMI control unit 170 to notify a vehicle occupant of a handover request in advance.

In addition, in a case where an abnormality occurs in sensors such as the finder 20, the radar 30, and the camera 40, or an abnormality occurs in information delivery between respective elements inside the vehicle control system 100, and thus it is difficult to continue the automated driving mode, the switching control unit 150 may switch the automated driving mode to the manual driving mode. Examples of the abnormality in the sensors include a state in which a detection result of the sensors cannot be transmitted to the vehicle control system 100 side, a state in which the detection result of the sensors shows an abnormal value, and the like. In addition, examples of the abnormality in the information delivery between elements include a state in which information of a trajectory generated by the trajectory generation unit 146 is not transmitted to the travel control unit 160 for a constant time, and the like.

In addition, in a case where the specific site exists in a range of a predetermined distance from a position of the subject vehicle M which is recognized by the subject vehicle position recognition unit 140, the switching control unit 150 may switch a driving mode from the automated driving mode to the manual driving mode in advance before the subject vehicle M reaches the specific site with reference to the high-accuracy map information MI.

The travel control unit 160 controls the travel drive force output device 200, the steering device 210, and the brake device 220 so that the subject vehicle M passes through a trajectory generated by the trajectory generation unit 146 at a scheduled time.

Figure 12:
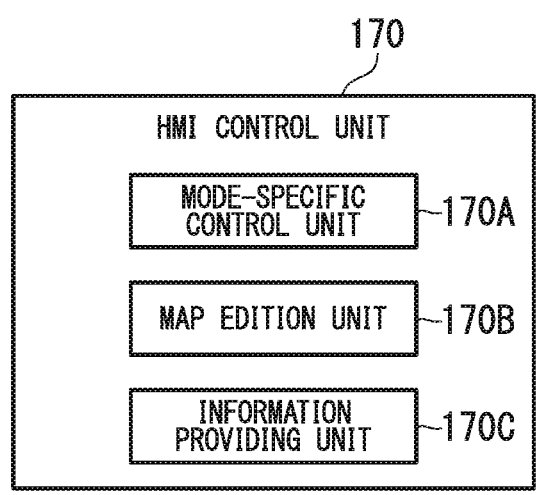
FIG. 12 is a view showing an example of a configuration of an HMI control unit 170.

FIG. 12 is a view showing an example of a configuration of the HMI control unit 170. The HMI control unit 170 includes a mode-specific control unit 170A, a map edition unit 170B, and an information providing unit 170C.

When being notified of automated driving mode information by the automated driving control unit 120, the mode-specific control unit 170A controls the HMI 70 in correspondence with an automated driving mode type with reference to the mode-specific operation availability information 188.

FIG. 13 is a view showing an example of the mode-specific operation availability information 188. The mode-specific operation availability information 188 shown in FIG. 13 includes a "manual driving mode" and an "automated driving mode" as an item of the driving mode item.

In addition, the "automated driving mode" includes the "mode A", the "mode B", the "mode C", and the like. In addition, the mode-specific operation availability information 188 includes a "navigation operation" that is an operation with respect to the navigation device 50, a "content reproducing operation" that is an operation with respect to the content reproducing device 85, an "instrument panel operation" that is an operation with respect to the display 82, and the like as items of the non-driving operation system. In an example of the mode-specific operation availability information 188 shown in FIG. 13, availability of an operation by a vehicle occupant with respect to the non-driving operation system is set for every driving mode described above, but a target interface device is not limited thereto.

The mode-specific control unit 170A determines a device (a part or all of the navigation device 50 and the HMI 70) for which use is permitted, and a device for which use is not permitted with reference to the mode information acquired from the automated driving control unit 120 and the mode-specific operation availability information 188. In addition, the mode-specific control unit 170A controls acceptability of an operation from the vehicle occupant with respect to the HMI 70 or the navigation device 50 of the non-driving operation system on the basis of a determination result.

For example, in a case where the driving mode that is executed by the vehicle control system 100 is the manual driving mode, the vehicle occupant operates the driving operation system (for example, the accelerator pedal 71, the brake pedal 74, the shift lever 76, the steering wheel 78, and the like) of the HMI 70. In addition, in a case where the driving mode that is executed by the vehicle control system 100 is the mode B, the mode C, and the like of the automated driving mode, the peripheral monitoring duty of the subject vehicle M occurs in the vehicle occupant. In this case, the mode-specific control unit 170A performs control not to accept an operation with respect to a part or all of the non-driving operation systems of the HMI 70 so as to prevent the vehicle occupant from being distracted (driver distraction) due to an action (for example, an operation of the HMI 70, and the like) other than driving. At this time, the mode-specific control unit 170A allows the display 82 to display existence of a nearby vehicle of the subject vehicle M or a state of the nearby vehicle, which is recognized by the external field recognition unit 142, as an image and the like, and may allow the HMI 70 to accept an confirmation operation in correspondence with a situation when the subject vehicle M travels so as to encourage a vehicle occupant to perform the peripheral monitoring of the subject vehicle M.

In addition, in a case where the driving mode is the mode A of the automated driving, the mode-specific control unit 170A mitigates regulation of the driver distraction, and performs control of accepting an operation of the vehicle occupant with respect to the non-driving operation system for which an operation is not accepted. For example, the mode-specific control unit 170A allows the display 82 to display a video, allows the speaker 83 to output voice, or allows the content reproduction device 85 to reproduce contents from a DVD and the like. Furthermore, for example, the contents which are reproduced by the content reproduction device 85 may include various kinds of contents related to amusement or entertainment such as a television program in addition to contents stored in the DVD and the like. In addition, the "content reproduction operation" shown in FIG. 13 may represent a content operation related to the amusement or entertainment.

In addition, in a case where the mode A is switched to the mode B or the mode C, that is, switching to the automated driving mode in which the periphery monitoring duty of the vehicle occupant increases is performed, the mode-specific control unit 170A allows the navigation device 50 or the HMI 70 of the non-driving operation system to output information indicating that the peripheral monitoring duty increases, or information indicating that the degree of permission of an operation with respect to the navigation device 50 or the HMI 70 of the non-driving operation system is lowered (an operation is limited). Furthermore, the information is not limited thereto, and may be, for example, information that encourages preparation to hand-over control.

As described above, the mode-specific control unit 170A can notify the vehicle occupant of imposing of the peripheral monitoring duty of the subject vehicle M on the vehicle occupant at an appropriate timing, for example, by notifying the vehicle occupant of an alarm and the like before a predetermined time at which the driving mode is switched from the mode A to the mode B or the mode C, or before the subject vehicle M reaches a predetermined speed. As a result, it is possible to provide a preparation period for switching of the automated driving to the vehicle occupant.

In addition, for example, in a case where it is determined that the mode A is switched to a mode such as the mode B in which the degree of automated driving is lower with reference to mode information that is given in notification from the automated driving control unit 120, the mode-specific control unit 170A generates vehicle-specific mode swathing information, and transmits the information to the server device 300 by using the vehicle-side communication device 55. Furthermore, the mode in which the degree of the automated driving is low may include the manual driving mode. The vehicle-specific switching information is an example of "information related to a switching site".

FIG. 14 is a view showing an example of the vehicle-specific mode switching information. As shown in the drawing, the vehicle-specific mode switching information is correlated with presence or absence of mode switching, time at which mode switching is performed, and a reason for the mode switching for every route along which the subject vehicle M travels (position information of a lane or a road). For example, in a case where mode switching, which is different from mode switching scheduled by the action plan information 186 and is not intended, is performed, information of "presence" is stored in an item of the presence or absence of mode switching. More specifically, when not being scheduled by the action plan, in a case of switching to a mode in which the degree of automated driving is low, for example, switching from the mode A to the mode B, and switching from any automated driving mode to the manual driving mode, information of "presence" is stored in the item. Furthermore, in a case where the automated driving mode does not perform unintended switching, and is terminated as scheduled, information of "absence" is stored in the item of the presence or absence of mode switching. For example, information of "even in the daytime, the periphery was dark to a certain extent in which image capturing by the camera 40 is cannot be performed", and information "automatic merging was difficult due to congestion of a merging site" are stored in the item of the reason for mode switching. For example, the vehicle-specific mode information is generated for every time interval such as for every day.

For example, in a case where the camera 40 is exposed to direct sunlight at the evening twilight, and the like, and thus pixels having a luminance value equal to or greater than a predetermined value on a captured image occupy the majority of the image, detection accuracy of the camera 40 is likely to deteriorate. According to this, at the time of the evening twilight, for example, the switching control unit 150 switches the driving mode to the manual driving mode, or the automated driving mode control unit 130 switches the driving mode to a mode in which the degree of automated driving is low so that the periphery monitoring duty further increases. As a result, with regard to a travel route at the evening twilight, the periphery is brighter than brightness that is assumed, and thus detection accuracy of the camera 40 deteriorates. According to this, information of "occurrence of mode switching" is correlated with the travel route.

In addition, at times such as morning and evening at which pedestrians such as commuters and schoolchildren, and bicycles are crowded, the pedestrians, the bicycles, and the like are likely to be determined as obstacles by the travel aspect determination unit 146A. In addition, traffic jam is likely to occur at times such as morning and evening. In this case, the automated driving mode control unit 130 may frequently perform switching to a mode in which the degree of automated driving is low, or the switching control unit 150 may frequently switch to the manual driving mode during the automated driving. In this case, the mode-specific control unit 170A correlates information of "mode switching is frequently necessary" with a travel route in the morning or in the evening In addition, at a site at which buildings such as tall buildings are crowded, electric waves radiated from the radar 30 are likely to be irregularly reflected, and thus detection accuracy of objects such as a nearby vehicle tends to deteriorate. According to this, at this site, for example, the switching control unit 150 switches the driving mode to the manual driving mode, or the automated driving mode control unit 130 switches the driving mode to a mode in which the degree of automated driving is low. Accordingly, at a site at which buildings such as tall buildings are crowded, electric waves reflecting objects are crowded, and thus detection accuracy of the radar 30 deteriorates. As a result, information of "occurrence of mode switching" is correlated.

In addition, at a site at which the automated driving mode cannot be continued due to road surface freezing, for example, the switching control unit 150 switches the driving mode to the manual driving mode. Accordingly, at this site, information of "occurrence of mode switching on the basis of a recognition result of the external field recognition unit 142" is correlated.

Furthermore, in a case where an abnormality inside the vehicle (an abnormality of a sensor or a communication abnormality of information), which does not depend on an ambient external environment, occurs, and thus the driving mode is switched, the mode-specific control unit 170A may not include information related to the mode switching caused by the abnormalities in the vehicle-specific mode switching information. That is, in a case of performing mode switching due to an abnormality inside the vehicle which does not depend on the ambient external environment, necessity for notifying another vehicle included in the communication system 1 of the mode switching information is low, and thus the mode switching information is handled as information that is not uploaded (transmitted) to the server device 300. Furthermore, in a case where the information of "occurrence of mode switching due to an abnormality inside the vehicle" is uploaded to the server device 300, the server device 300 side may exclude the information.

In a case where "information related to a specific site" is received by the vehicle-side communication device 55, the map edition unit 170B edits the high-accuracy map information MI by adding position information of the specific site, which is indicated by the information related to the specific site, to the high-accuracy map information MI stored in the vehicle-side storage 180.

Figure 15:
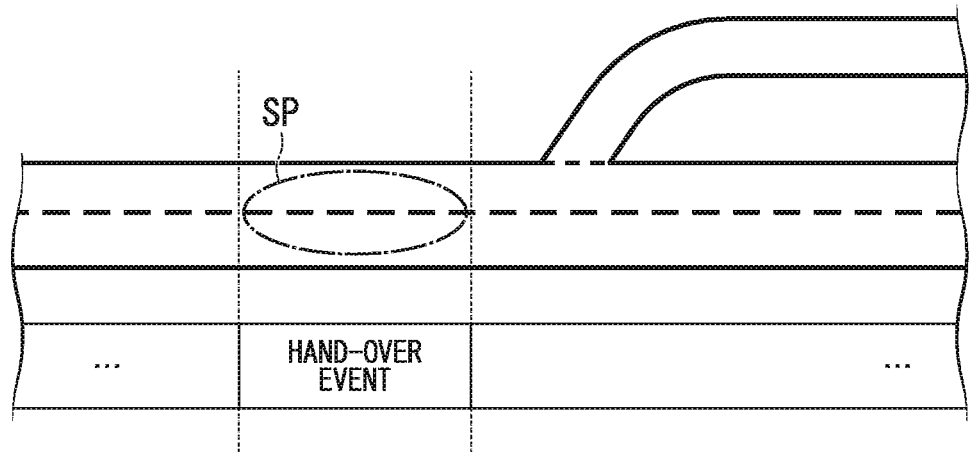
FIG. 15 is a view showing an example of high-accuracy map information MI to which position information of a specific site is added.

FIG. 15 is a view showing an example of the high-accuracy map information MI to which the position information of the specific site is added. SP in the drawing represents the specific site. As shown in the drawing, when a position of the specific site SP is added to a high-accuracy map, a section including the site is switched, for example, to the hand-over event, an event of switching to a mode in which the degree of automated driving is low under the automated driving mode, and the like.

In a case where the subject vehicle M approaches the specific site indicated by the high-accuracy map information MI, the information providing unit 170C outputs predetermined information by using the navigation device 50 or the HMI 70 before the subject vehicle M approaches the specific site indicated by the high-accuracy map information MI with reference to the high-accuracy map information MI edited by the map edition unit 170B, or the high-accuracy map information MI including the position information of the specific site which is received by the vehicle-side communication device 55. Examples of the predetermined information include information indicating existence of the specific site, information indicating a distance or time necessary to reach the specific site, information indicating occurrence of mode switching in the vicinity of the specific site, and the like. For example, in a case where the specific site exists within a predetermined distance range from a position of the subject vehicle M which is recognized by the subject vehicle position recognition unit 140, or at a point of time before a predetermined distance or a predetermined time necessary to reach the specific site, the information providing unit 170C outputs voice (beep sound or announcement voice) from the speaker 83 or displays an image on the display 82 to provide information of existence of a specific site, a distance or a time necessary to reach the specific site, and the like to the vehicle occupant.

Figure 16:
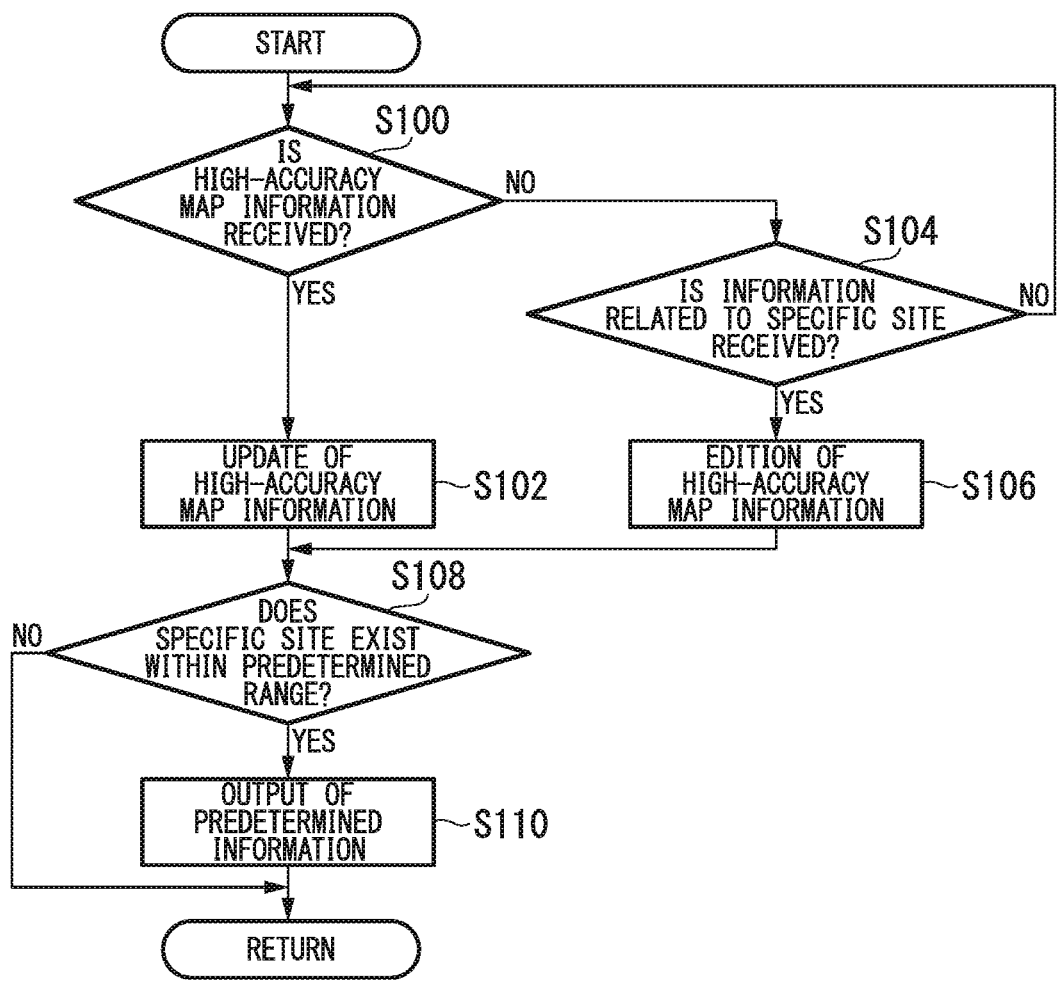
FIG. 16 is a flowchart showing an example of a flow of processing that is performed by the vehicle control system 100.

FIG. 16 is a flowchart showing an example of a flow of processing performed by the vehicle control system 100. The processing of this flowchart is performed whenever the high-accuracy map information MI or information related to the specific site is received from the server device 300.

First, the map edition unit 170B determines whether or not the high-accuracy map information MI including information related to the specific site information is received by the vehicle-side communication device 55 (step S100), in a case where the high-accuracy map information MI is received by the vehicle-side communication device 55, the map edition unit 170B rewrites the high-accuracy map information MI in high-accuracy map information MI stored in the vehicle-side storage 180 to update the high-accuracy map information MI (step S102).

On the other hand, in a case where the high-accuracy map information MI is not received by the vehicle-side communication device 55, the map edition unit 170B determines whether or not information related to the specific site is received by the vehicle-side communication device 55 (step S104). In a case where the information related to the specific site is received by the vehicle-side communication device 55, the map edition unit 170B edits the high-accuracy map information MI by adding position information of the specific site which is indicated by the information related to the specific site to the high-accuracy map information MI stored in the vehicle-side storage 180 (step S106).

On the other hand, in a case where the information related to the specific site is not received by the vehicle-side communication device 55, the map edition unit 170B transitions processing to step S100, and waits until any one of the high-accuracy map information MI including the information related to the specific site, and the information related to the specific site is received.

Next, the information providing unit 170C determines whether or not the specific site exists in a predetermined distance range from a position of the subject vehicle M which is recognized by the subject vehicle position recognition unit 140 with reference to the high-accuracy map information MI (step S108). In a case where the specific site does not exist within the predetermined distance range, the HMI control unit 170 terminates the processing of this flowchart.

On the other hand, in a case where the specific site exists within the predetermined distance range, the information providing unit 170C outputs predetermined information by using the navigation device 50 or the HMI 70 before the subject vehicle M reaches the specific site (step S110). At this time, in a case where a driving mode that is executed is an arbitrary automated driving mode, the automated driving mode control unit 130 may switch the automated driving mode to a mode in which the degree of automated driving is lower in advance before the subject vehicle M reaches the specific site. In addition, the switching control unit 150 may switch the driving mode from the automated driving mode to the manual driving mode in advance before the subject vehicle M reaches the specific site. According to this, the processing of this flowchart is terminated.

[Server Device]

Figures 17, 18:
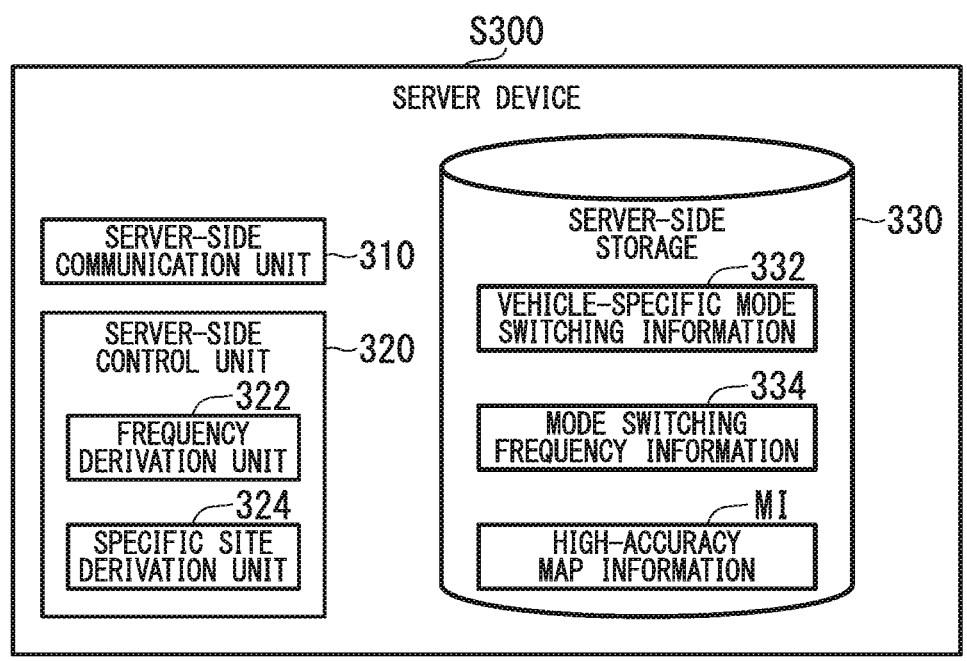
FIG. 17 is a view showing an example of a configuration of a server device 300 according to this embodiment.
FIG. 18 is a view showing an example of mode switching frequency information 334.

Hereinafter, the server device 300 will be described. FIG. 17 is a view showing an example of a configuration of the server device 300 according to this embodiment. For example, the server device 300 includes a server-side communication unit 310, a server-side control unit 320, and a server-side storage 330.

The server-side communication unit 310 performs communication with the vehicle-side communication device 55 through the radio base station BS and the network NW. For example, the server-side communication unit 310 collects the vehicle-specific mode switching information from the vehicle-side communication device 55 mounted on each of a plurality of vehicles. In the following description, a reference numeral 332 will be given to the vehicle-specific mode switching information collected from the vehicle-side communication device 55.

For example, the server-side control unit 320 includes a frequency derivation unit 322 and a specific site derivation unit 324. A part or all of the units are realized when a processor executes a program (software). In addition, a part or all of the units may be realized by hardware such as LSI and ASIC, or may be realized by a combination of software and the hardware.

For example, information such as the vehicle-specific mode switching information 332, mode switching frequency information 334, and the high-accuracy map information MI is stored in the server-side storage 330. The server-side storage 330 is realized by a ROM, a RAM, an HDD, a flash memory, and the like. The program that is executed by the processor may be stored in the server-side storage 330 in advance, or may be downloaded from an external device through the network NW, and the like. In addition, the program may be installed in the server-side storage 330 when a portable storage medium that stores the program is mounted in a drive device (not shown). In addition, the server device 300 may be dispersed among a plurality of computer devices.

The frequency derivation unit 322 derives a driving mode switching frequency for every travel route and every travel time of the subject vehicle M on the basis of the vehicle-specific mode switching information 332 that is collected by the server-side communication unit 310. For example, the frequency derivation unit 322 derives the driving mode switching frequency for every route and every time by statically calculating the number of times of driving mode switching with respect to a route and a time at which mode switching is performed with reference to the vehicle-specific mode switching information 332. The driving mode switching frequency is an example of an "index based on a numerical value obtained by statistic calculation of presence or absence of driving mode switching".

For example, the frequency derivation unit 322 sets the sum of the number of times of non-execution of mode switching (mode switching is "absence") and the number of times of execution of mode switching (mode switching is "presence") as a parameter with reference to the item of presence or absence of mode switching in the vehicle-specific mode switching information 332 for every route and every time, and derives a ratio of the number of times of execution of the mode switching to the parameter as a frequency. In addition, examples of the parameter that is used in the frequency derivation include the number of vehicles counted for every route which is used in traffic jam prediction and the like, and the like. In this case, a vehicle on which the vehicle control system 100 or a device equivalent to the vehicle control system 100 is mounted (hereinafter, referred to as "automated driving vehicle"), and a vehicle on which the device is not mounted (hereinafter, referred to as "manual driving vehicle) may be included in the number of vehicles. Accordingly, in a case of using the number of vehicles for every route as the parameter, automated driving vehicle penetration and the like may be considered. For example, a value obtained by multiplying the number of vehicles for every route by the automated driving vehicle penetration may be handled as the parameter.

In addition, the frequency derivation unit 322 performs statistical processing such as linear weighting moving average and index moving average with respect to the frequency that is derived. For example, if the frequency relates to mode switching that is performed lately, the frequency derivation unit 322 further increases weighting. In addition, the frequency relates to mode switching that is performed long ago, the frequency derivation unit 322 further decreases the weighting. In this tendency, the frequency derivation unit 322 averages the frequency for every route. More specifically, for example, as the day goes such as before five days, before four days, and before three days, the frequency derivation unit 322 increases the weighting that is applied to the frequency corresponding to the days to average the frequency. The driving mode switching frequency derived as described above is stored in the server-side storage 330 as the mode switching frequency information 334.

FIG. 18 is a view showing an example of the mode switching frequency information 334. As shown in the drawing, the mode switching frequency information 334 includes a map in which the driving mode switching frequency is correlated with a travel distance and a travel time for every day and every route. In addition, the map of the mode switching frequency information 334 may be substituted with a table, a function, and the like which are equivalent to the map.

Figure 19:
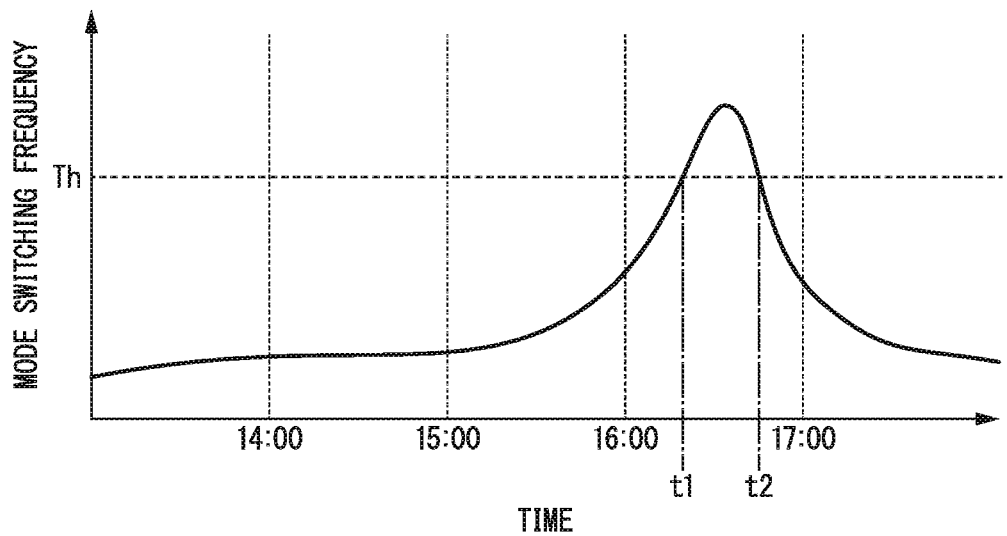
FIG. 19 is a view showing an example of a map of the mode switching frequency information 334.
Figure 20:
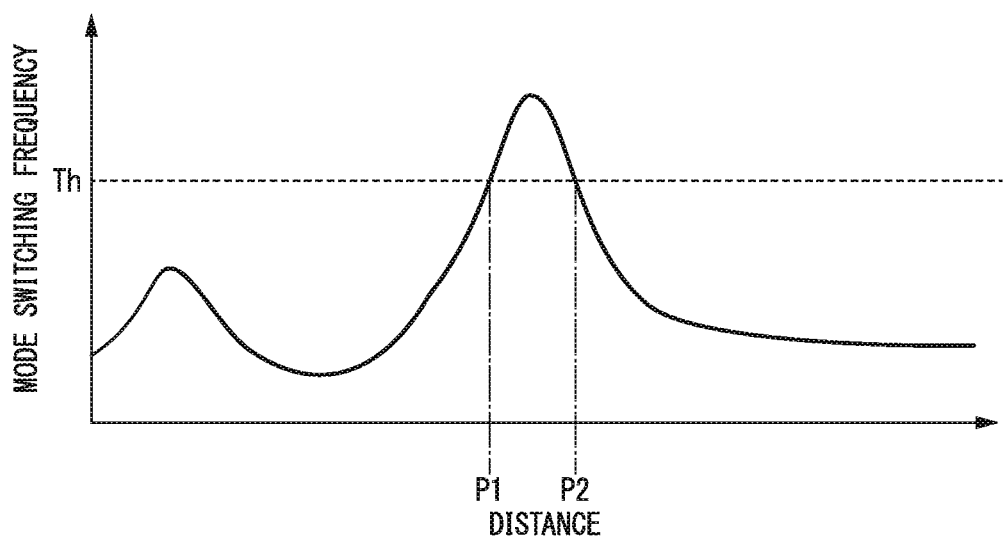
FIG. 20 is a view showing another example of the map of the mode switching frequency information 334.

FIG. 19 and FIG. 20 are views showing an example of the map of the mode switching frequency information 334. In the map shown in the example of FIG. 19, a variation of the driving mode switching frequency with respect to time at an arbitrary site is shown. In addition, in the map shown in the example of FIG. 20, a variation of the driving mode switching frequency with respect to a travel distance in an arbitrary route is shown.

The specific site derivation unit 324 derives a position of the specific site with reference to the mode switching frequency information 334 that is derived by the frequency derivation unit 322.

For example, in the example of FIG. 19, the specific site derivation unit 324 determines whether or not the driving mode switching frequency is greater than a threshold value Th, and in a case where the driving mode switching frequency is greater than the threshold value Th, the specific site derivation unit 324 derives a site at which the subject vehicle M (or another vehicle) travels for a time (from t1 to t2 in the drawing) at which the frequency is equal to or greater than the threshold value Th as the specific site.

In addition, in the example of FIG. 20, the specific site derivation unit 324 determines whether or not the driving mode switching frequency is greater than the threshold value Th, and in a case where the driving mode switching frequency is greater than the threshold value Th, the specific site derivation unit 324 derives a section (section from P1 to P2 in the drawing) in which the frequency is equal to or greater than the threshold value Th as the specific site.

In addition, the specific site derivation unit 324 transmits position information of the derived specific site to the vehicle-side communication device 55, which is mounted on one or a plurality of vehicles, as information related to the specific site by using the server-side communication unit 310.

Furthermore, the specific site derivation unit 324 may transmit the high-accuracy map information MI, to which the position information of the specific site is added, instead of transmitting the position information of the specific site. For example, the specific site derivation unit 324 adds the position information of the derived specific site to a part or the entirety of the high-accuracy map information MI with reference to the high-accuracy map information MI stored in the server-side storage 330. For example, the specific site derivation unit 324 adds the position information of the specific site with respect to only partial high-accuracy map information MI including a section through which the vehicle, on which the vehicle control system 100 is mounted, is scheduled to travel. In addition, the specific site derivation unit 324 transmits the high-accuracy map information MI to which the position information of the specific site is added to the vehicle-side communication device 55 that is mounted on one or a plurality of vehicles by using the server-side communication unit 310.

Figure 21:
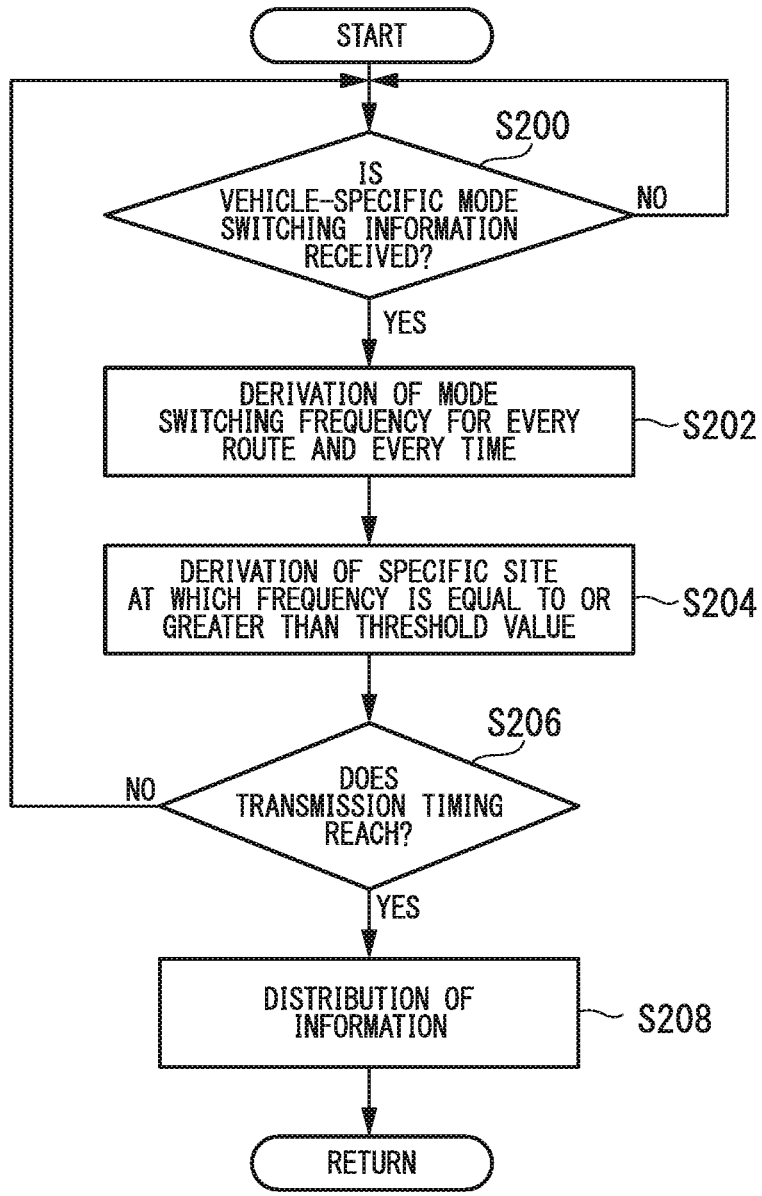
FIG. 21 is a flowchart showing an example of a flow of processing that is performed by the server device 300.

Hereinafter, a flow of a series of processing of the server device 300 will be described. FIG. 21 is a flowchart showing an example of a flow of processing that is performed by the server device 300.

First, the frequency derivation unit 322 waits until the vehicle-specific mode switching information 332 is received by the server-side communication unit 310 (step S200), and when vehicle-specific mode switching information 332 is received, the frequency derivation unit 322 derives the driving mode switching frequency for every route and every time at which the subject vehicle M travels on the basis of the vehicle-specific mode switching information 332 (step S202).

Next, the specific site derivation unit 324 derives the position of the specific site on the basis of the driving mode switching frequency derived by the frequency derivation unit 322 (step S204). Next, the specific site derivation unit 324 waits until a predetermined transmission timing reaches (step S206), and when the transmission timing reaches, the specific site derivation unit 324 transmits position information of the derived specific site to the vehicle-side communication device 55 that is mounted on one or a plurality of vehicles as information related to the specific site by using the server-side communication unit 310 (step S208). In addition, the specific site derivation unit 324 may add the position information of the specific site to a part or the entirety of the high-accuracy map information MI stored in the server-side storage 330 and may transmit the high-accuracy map information MI to the vehicle-side communication device 55 instead of transmitting the position information of the specific site.

According to this, the server device 300 can notify the vehicle control system 100 mounted on each vehicle of existence of a specific site including a site at which sunlight is intensive at a specific time, a site at which electric waves interfere, a site at which road surface freezing is likely to occur, a site at which traffic jam is likely to occur, and the like. As a result, the vehicle control system 100 can encourage a vehicle occupant to pay attention or can perform mode switching before reaching the specific site.

According to the above-described embodiment, a peripheral situation of the subject vehicle M is recognized, a plurality of driving modes including an automated driving mode of automatically performing at least one of speed control and steering control of the subject vehicle M are executed, a driving mode that is executed is switched on the basis of the peripheral situation of the subject vehicle M, information (vehicle-specific mode switching information) related to a switching site switched to a driving mode in which the degree of automated driving is low on the basis of the peripheral situation is transmitted to the server device 300, information related to a specific site (high-accuracy map information MI or information related to the specific site) that is determined on the basis of information related to the switching site which is collected from a vehicle is received from the server device 300, predetermined information is output in a case where the subject vehicle M approaches the specific site indicated by the received information related to the specific site to notify a vehicle occupant of the information of the specific site at which switching of automated driving is frequently performed in advance so that the vehicle occupant can take various actions.

In addition, according to the above-described embodiment, in a situation capable of continuing a mode in which the degree of automated driving is high, the automated driving control unit 120 can switch the driving mode to a mode in which the degree of automated driving is low in advance before reaching the specific site with reference to the position information of the specific site which is included in the high-accuracy map information MI, and thus the vehicle occupant can take various actions with leeway.

Hereinbefore, aspects for carrying out the invention have been described with reference to the embodiment, but the invention is not limited to the embodiment, and various modifications and substitutions can be made in a range not departing from the gist of the invention.

REFERENCE SIGNS LIST

20 Finder
30 Radar
40 Camera
DD Detection device
50 Navigation device
55 Vehicle-side communication device
60 Vehicle sensor
70 HMI
100 Vehicle control system
110 Target lane determination unit
120 Automated driving control unit
130 Automated driving mode control unit
140 Subject vehicle position recognition unit
142 External field recognition unit
144 Action plan generation unit
146 Trajectory generation unit
146A Travel aspect determination unit
146B Trajectory candidate generation unit
146C Evaluation and selection unit
150 Switching control unit
160 Travel control unit
170 HMI control unit
180 Vehicle-side storage
200 Travel drive force output device
210 Steering device
220 Brake device
M Subject vehicle
300 Server device
310 Server-side communication unit
320 Server-side control unit
322 Frequency derivation unit
324 Specific site derivation unit
330 server-side storage

What is claimed is:

1. A vehicle control system, comprising:
a memory that stores program components; and
a processor that executes the program components, the program components comprising:
a recognition unit configured to recognize a peripheral situation of a subject vehicle;
an automated driving control unit configured to
execute a plurality of driving modes including an automated driving mode of automatically performing at least one of speed control or steering control of the subject vehicle, and
switch a currently executed driving mode based on the peripheral situation recognized by the recognition unit;
a communication unit configured to
transmit, to an external device, first information related to switching sites switched by the automated driving control unit from a first driving mode in which an operation by a driver is not necessary to a second driving mode in which an operation by the driver is necessary based on the peripheral situation recognized by the recognition unit, and
receive, from the external device, second information related to a specific site derived based on the first information related to the switching sites, which is collected from vehicles, wherein the first information related to the switching sites includes information indicating whether each of the vehicles performs switching of the driving mode at each of the switching sites, and
the external device is configured to derive an index based on a numerical value obtained by statistic calculation of presence or absence of the switching of the driving mode for each of the switching sites, determine a site at which the index derived for each of the switching sites is greater than a threshold value as the specific site, and transmit, as the second information, information related to the specific site to the communication unit; and
an information providing unit configured to output third information indicating that switching of the driving mode occurs in a vicinity of the specific site before the subject vehicle reaches the specific site indicated by the second information by a predetermined distance or by a predetermined time.

2. The vehicle control system according to claim 1, wherein the automated driving control unit is configured to switch the current driving mode based on the second information related to the specific site.

3. The vehicle control system according to claim 1, wherein the program components further comprise:
a map edition unit configured to add, to map information, position information of the specific site, wherein the position information is indicated by the second information that relates to the specific site.

4. The vehicle control system according to claim 1, wherein
the external device is configured to derive a position of the specific site based on the first information related to the switching sites which is collected from the vehicles, and add derived position information of the specific site to map information that is retained by the external device, and
the second information related to the specific site is information obtained by adding the position information of the specific site to at least a portion of the map information that is retained by the external device.

5. A vehicle control method, comprising:
recognizing, by a system comprising a processor, a peripheral situation of a subject vehicle;
executing, by the system, a plurality of driving modes, the plurality of driving modes comprising an automated driving mode of automatically performing at least one of speed control or steering control of the subject vehicle;
switching, by the system, a driving mode that is executed based on the peripheral situation;
transmitting, by the system to an external device, first information related to switching sites switched from a first driving mode in which an operation by a driver is not necessary to a second driving mode in which an operation by the driver is necessary based on the peripheral situation;
receiving, by the system from the external device, second information related to a specific site derived based on the first information related to the switching sites, which is collected from vehicles including the subject vehicle, wherein
the first information related to the switching sites comprises information indicating whether each of the vehicles performs switching of the driving mode at each of the switching sites, and the external device derives an index based on a numerical value obtained by statistic calculation of presence or absence of the switching of the driving mode for each of the switching sites, identifies a site at which the index derived for each of the switching sites is greater than a threshold value as the specific site, and transmits, as the second information, information related to the specific site; and outputting, by the system, third information indicating that switching of the driving mode occurs in a vicinity of the specific site before the subject vehicle reaches the specific site indicated by the second information by a predetermined distance or by a predetermined time.

6. The vehicle control method of claim 5, further comprising switching, by the system, the driving mode based on the second information related to the specific site.

7. A non-transitory computer readable storage medium storing a vehicle control program that, in response to execution, cause a system to perform operations, the operations comprising:

recognizing a peripheral situation of a subject vehicle;

executing a plurality of driving modes including an automated driving mode of automatically performing at least one of speed control or steering control of the subject vehicle;

switching a driving mode that is executed based on the peripheral situation;

transmitting, to an external device, first information related to switching sites switched from a first driving mode in which an operation by a driver is not necessary to a second driving mode in which an operation by the driver is necessary based on the peripheral situation;

receiving second information related to a specific site derived based on the first information related to the switching sites and collected from multiple vehicles including the subject vehicle, wherein the first information related to the switching sites comprises information indicating whether the multiple vehicles respectively perform switching of the driving mode at each of the switching sites, and the external device derives an index based on a numerical value obtained by statistic calculation of presence or absence of the switching of the driving mode for each of the switching sites, identifies a site at which the index derived for each of the switching sites is greater than a threshold value as the specific site, and transmits, as the second information, information related to the specific site; and outputting third information indicating that switching of the driving mode occurs in a vicinity of the specific site before the subject vehicle reaches the specific site indicated by the second information by a predetermined distance or by a predetermined time.

* * * * *